United States Patent
Kim et al.

(10) Patent No.: US 9,667,855 B2
(45) Date of Patent: May 30, 2017

(54) MOBILE TERMINAL FOR FOCUSING OF IMAGE CAPTURING AND METHOD FOR CONTROLLING THE SAME

(71) Applicant: LG ELECTRONICS INC., Seoul (KR)

(72) Inventors: Jonghwan Kim, Seoul (KR); Hyungjin Kim, Seoul (KR); Woochan Seo, Seoul (KR); Kyungjin Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 14/697,777

(22) Filed: Apr. 28, 2015

(65) Prior Publication Data

US 2016/0065832 A1    Mar. 3, 2016

(30) Foreign Application Priority Data

Aug. 28, 2014    (KR) ........................ 10-2014-0113278

(51) Int. Cl.
| | |
|---|---|
| *H04N 5/232* | (2006.01) |
| *G02B 13/00* | (2006.01) |
| *H04N 13/00* | (2006.01) |
| *H04N 13/02* | (2006.01) |

(52) U.S. Cl.
CPC ....... *H04N 5/23212* (2013.01); *G02B 13/001* (2013.01); *H04N 5/23216* (2013.01); *H04N 5/23293* (2013.01); *H04N 13/0022* (2013.01); *H04N 13/0242* (2013.01); *H04N 5/23219* (2013.01); *H04N 2013/0077* (2013.01)

(58) Field of Classification Search
CPC .................................................. H04N 5/23212
USPC ...................................................... 348/231.1
See application file for complete search history.

(56) References Cited

U.S. PATENT DOCUMENTS

| | | | | |
|---|---|---|---|---|
| 8,988,429 B2* | 3/2015 | Kwon | ................ | H04N 13/0271 345/419 |
| 2007/0274703 A1* | 11/2007 | Matsuda | ................ | G03B 13/12 396/264 |
| 2008/0063389 A1* | 3/2008 | Fang | ....................... | G03B 13/36 396/56 |
| 2008/0131019 A1* | 6/2008 | Ng | .......................... | G06T 5/001 382/255 |
| 2009/0060281 A1* | 3/2009 | Tanida | ....................... | G06T 3/00 382/106 |
| 2009/0244357 A1* | 10/2009 | Huang | ................ | H04N 5/23293 348/345 |
| 2010/0103259 A1* | 4/2010 | Tanida | ................ | G01B 11/026 348/139 |

(Continued)

Primary Examiner — Roberto Velez
Assistant Examiner — Cynthia Segura
(74) Attorney, Agent, or Firm — KED & Associates, LLP

(57) ABSTRACT

A mobile terminal which is capable of capturing an image focused on according to a distance from an object, includes a camera configured to sense an object using a plurality of lenses, a display unit configured to display an image received through the camera, and a controller that is configured to recognize capturing distances between the plurality of lenses and the object using sensing information on the object, generate a focal zone, defined by focal distances corresponding to some of the recognized capturing distances, and control a display unit to output an image focusing on at least one object included in the focal zone.

20 Claims, 20 Drawing Sheets

(56) References Cited

U.S. PATENT DOCUMENTS

| | | | |
|---|---|---|---|
| 2010/0220208 A1* | 9/2010 | Park | G03B 13/36 348/222.1 |
| 2012/0019703 A1* | 1/2012 | Thorn | G06T 5/002 348/333.03 |
| 2013/0342526 A1* | 12/2013 | Ng | G06T 15/205 345/419 |
| 2014/0009585 A1* | 1/2014 | Campbell | H04N 13/0203 348/47 |
| 2014/0092272 A1* | 4/2014 | Choi | H04N 5/23293 348/222.1 |
| 2014/0098195 A1* | 4/2014 | Pace | H04N 13/0242 348/47 |
| 2016/0044228 A1* | 2/2016 | Kim | H04N 5/2258 348/345 |

* cited by examiner

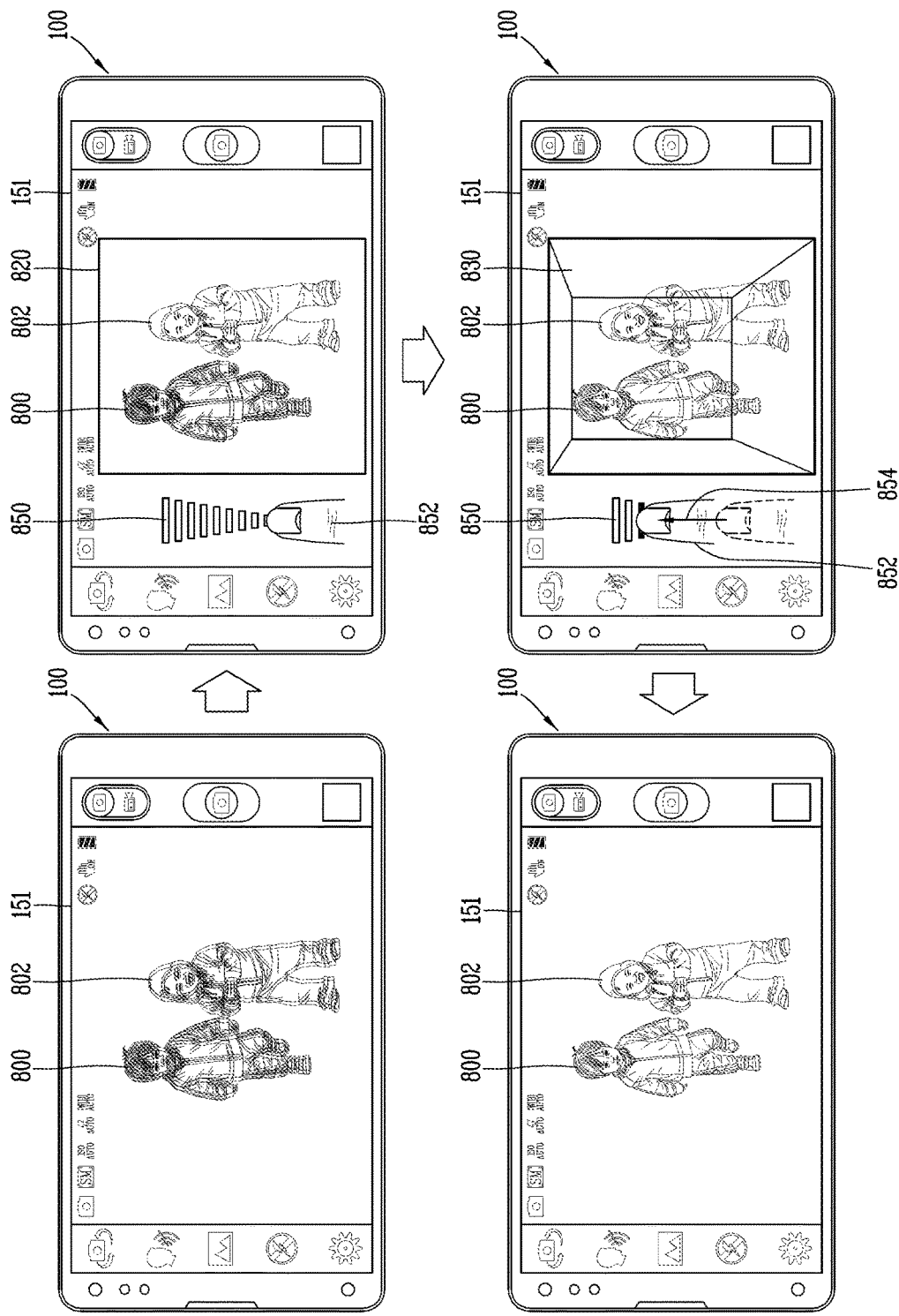

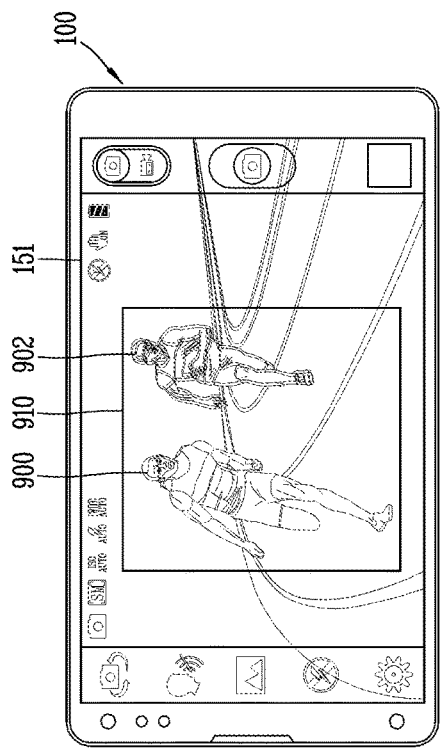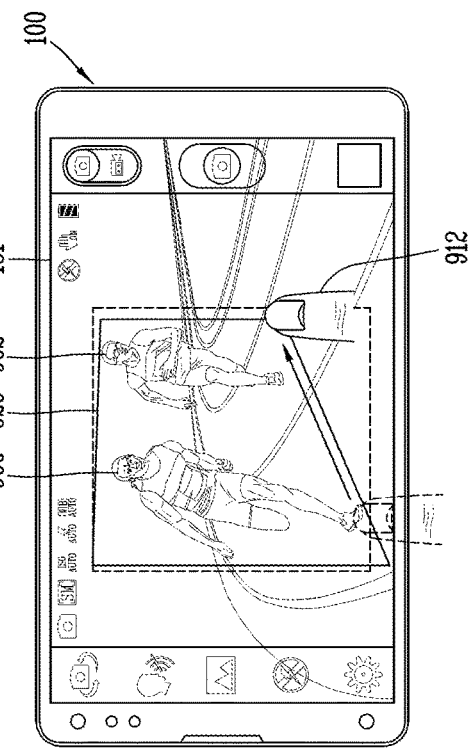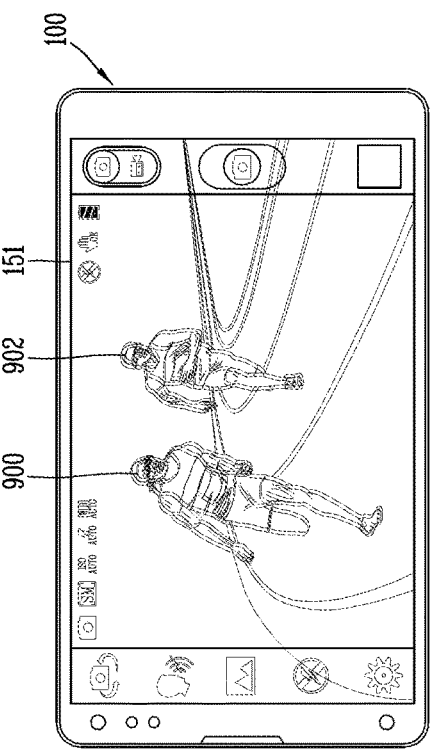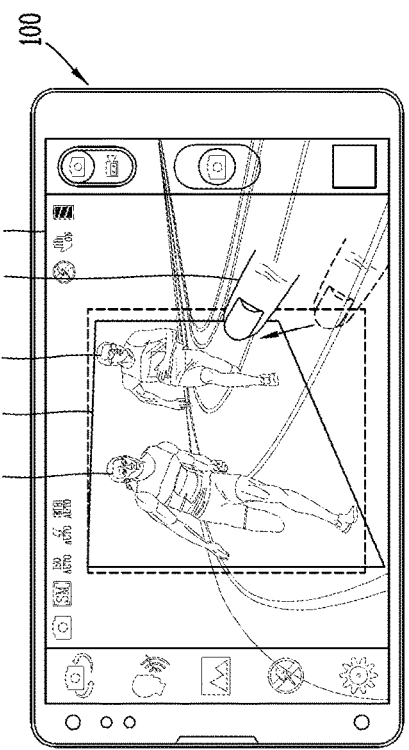

FIG. 11A
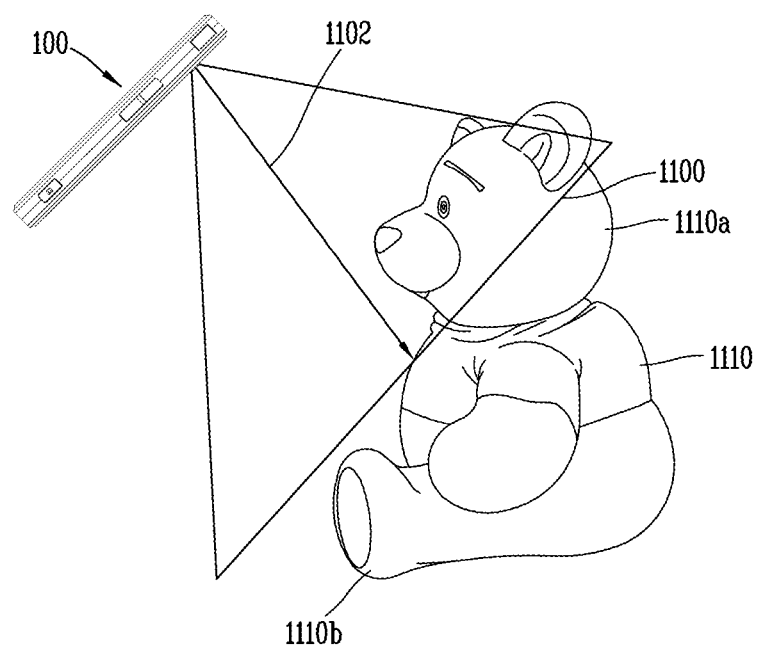
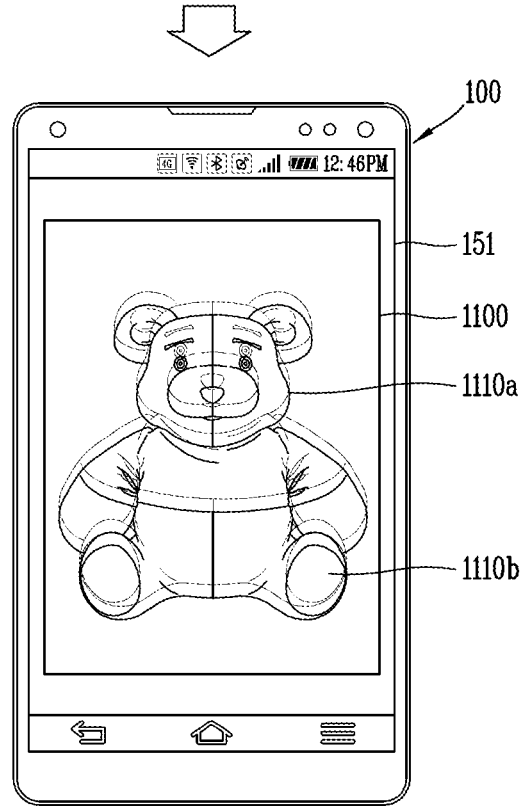

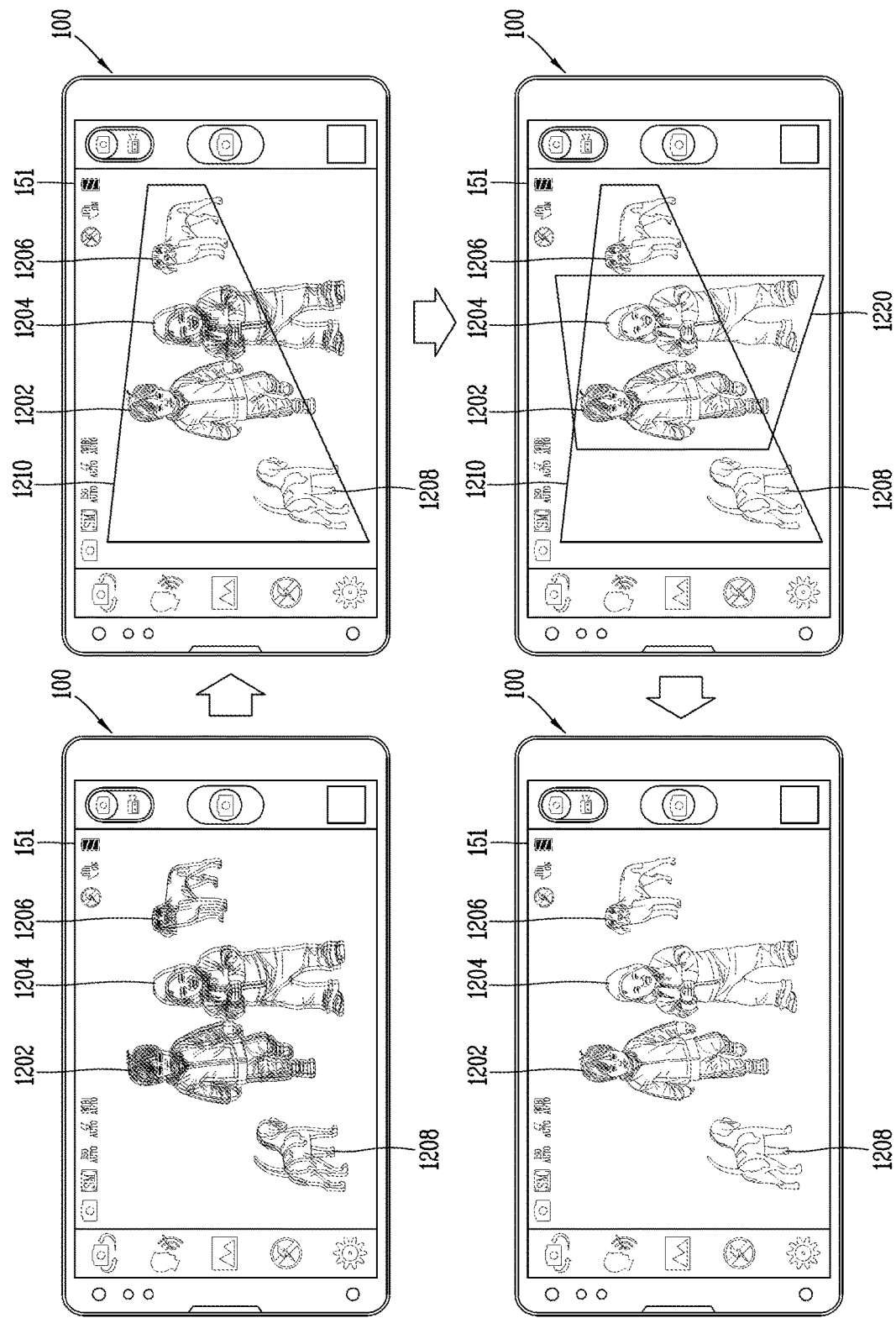

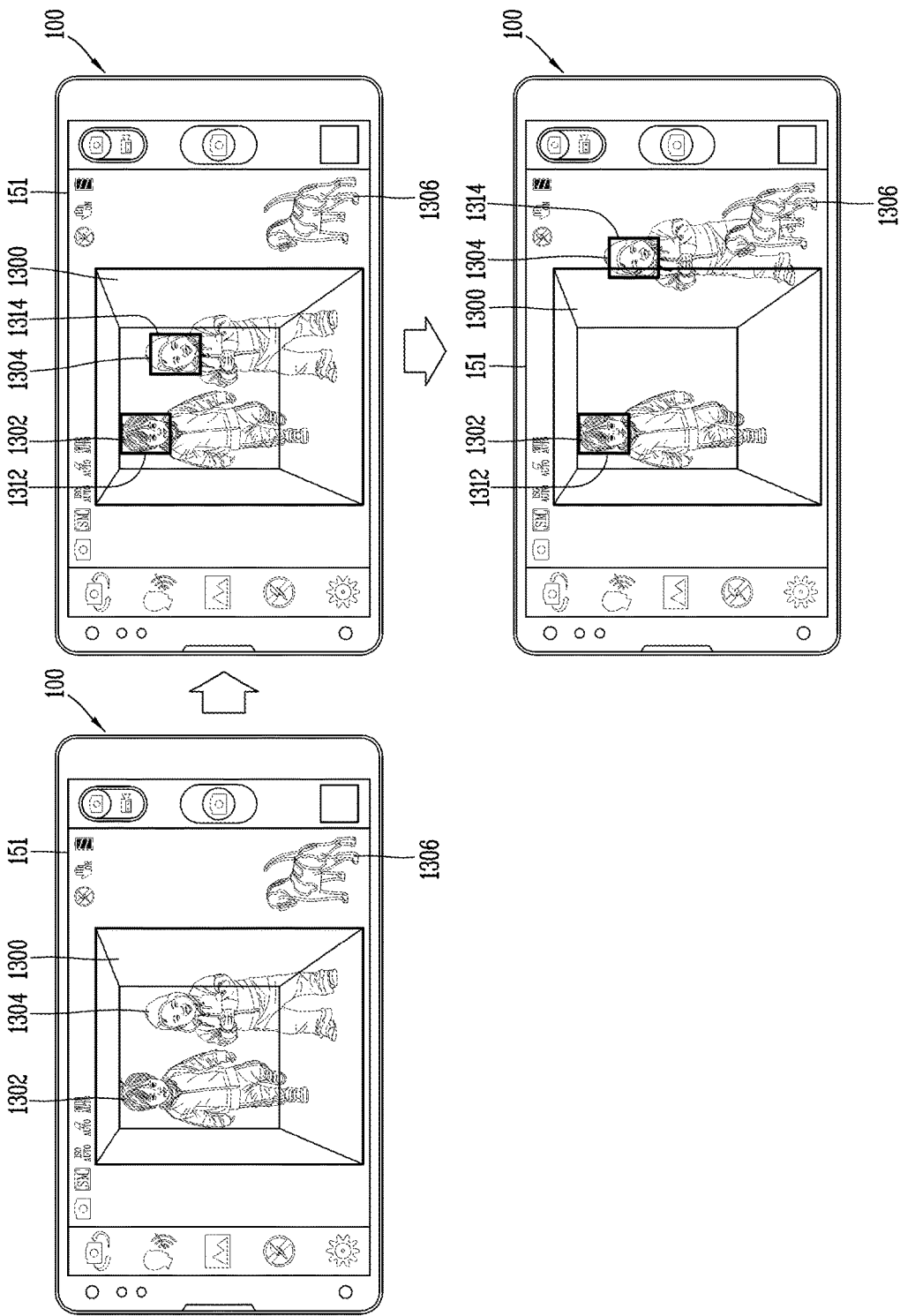

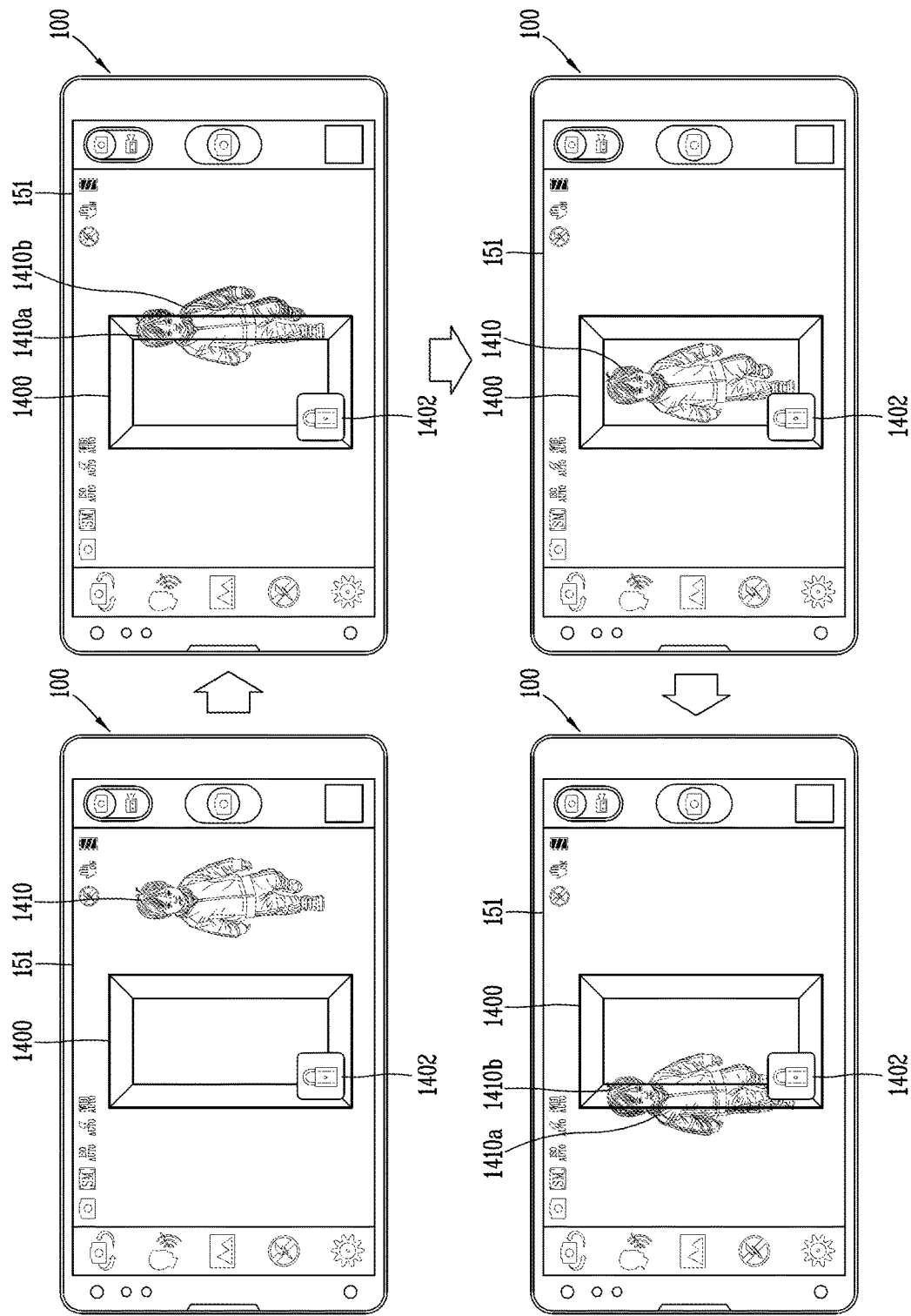

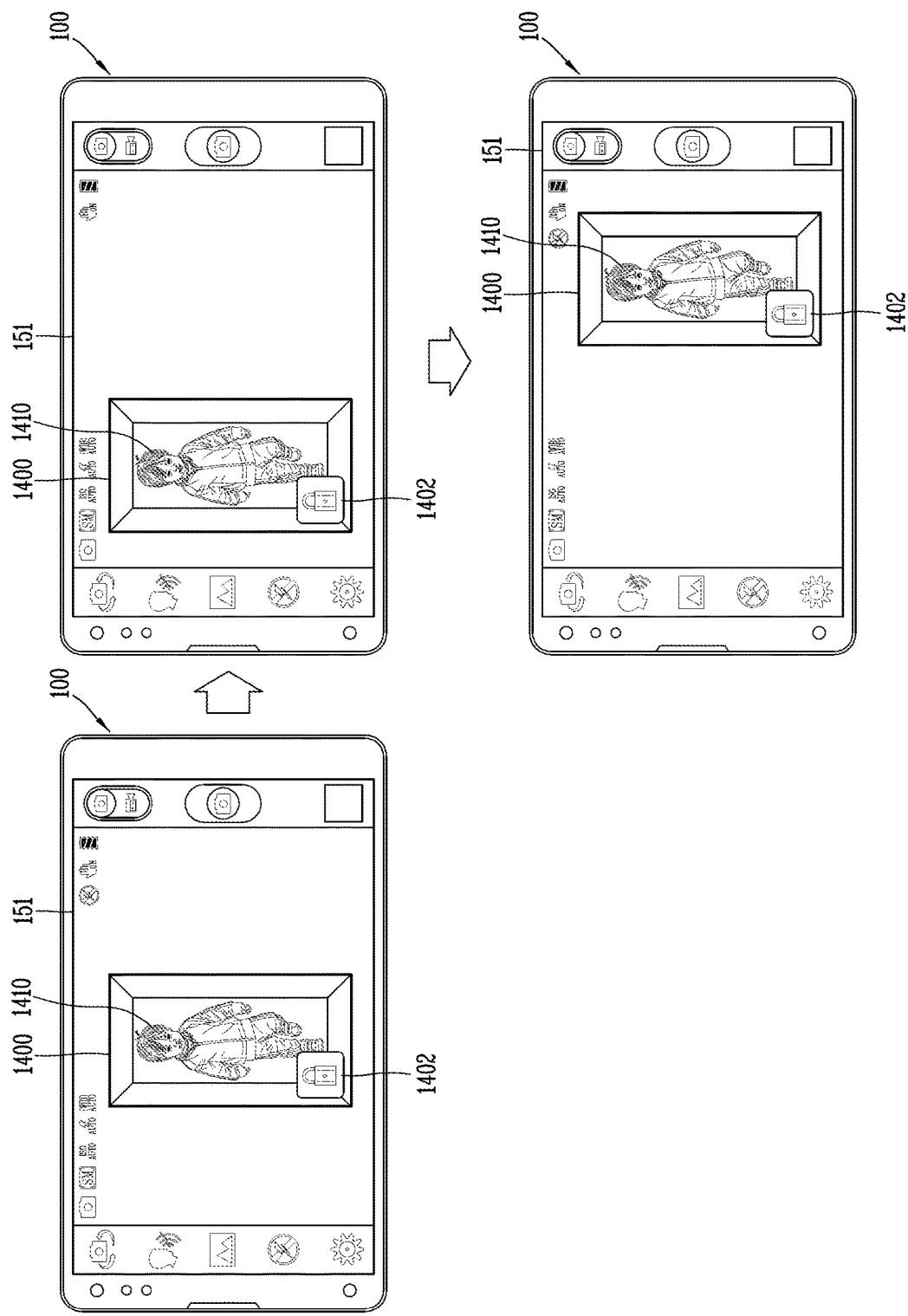

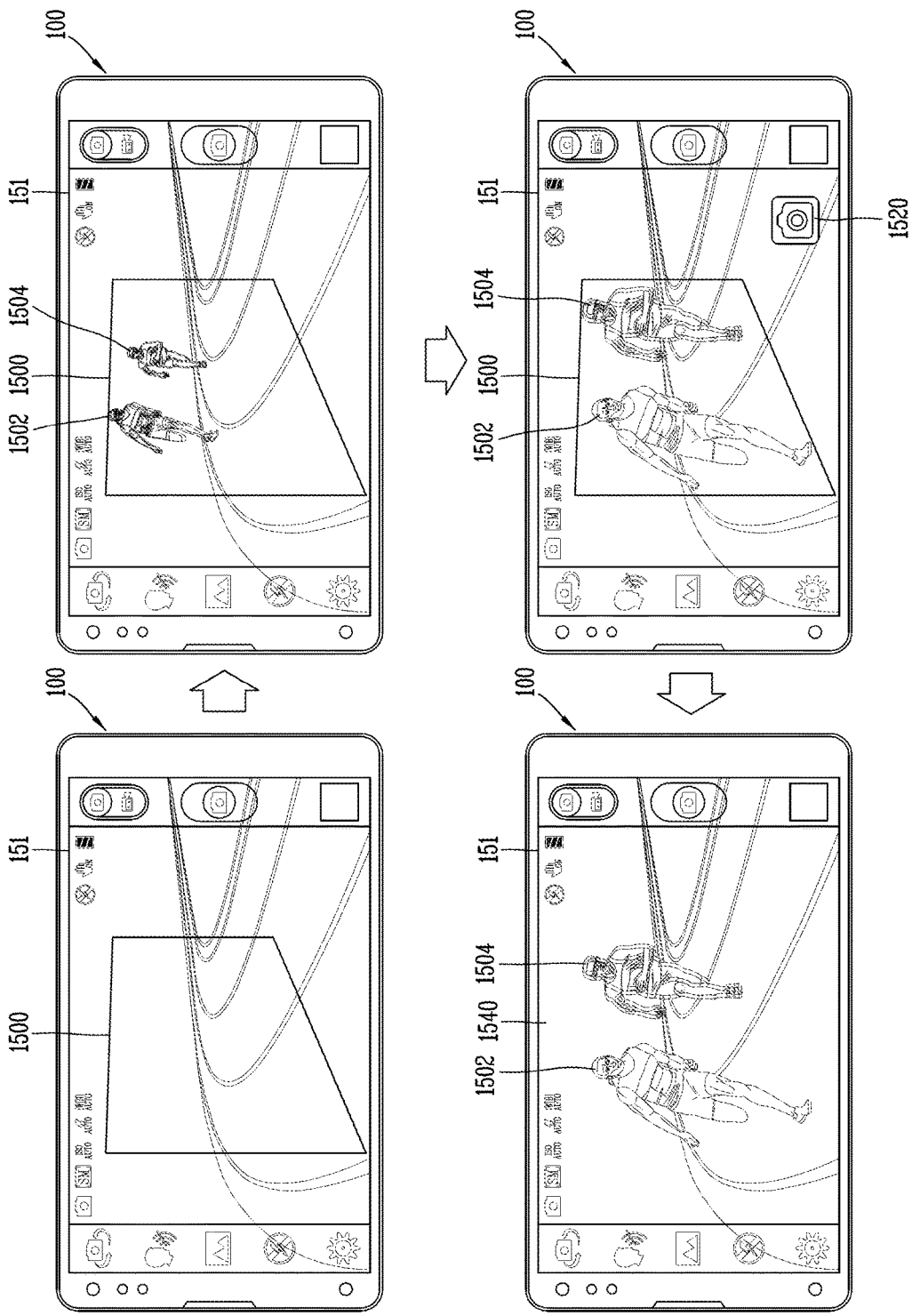

MOBILE TERMINAL FOR FOCUSING OF IMAGE CAPTURING AND METHOD FOR CONTROLLING THE SAME

CROSS-REFERENCE TO RELATED APPLICATION

This application claims priority under 35 U.S.C. §119 to Korean Application No. 10-2014-0113278, filed on Aug. 28, 2014, whose entire disclosure is hereby incorporated by reference.

BACKGROUND

1. Field

This specification relates to a mobile terminal capable of capturing an image which is focused on object to be captured according to a distance from the object.

2. Background

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal.

Owing to the improvement, a mobile terminal may be provided with a camera having a plurality of lenses. The camera may enable capturing of objects located at different capturing distances (object distances, focal distances, etc.).

SUMMARY OF THE DISCLOSURE

Therefore, an aspect of the detailed description is to provide a mobile terminal, capable of capturing an image focused on at least one object which has a different capturing distance (focal distance or capturing distance), and a control method thereof.

Another aspect of the detailed description is to provide a mobile terminal, capable of capturing an image focused on an object, which is located at a tilted or inclined place, without a change in a composition or posture for capturing the image, and a control method thereof.

Another aspect of the detailed description is to provide a mobile terminal, capable of generating a focal zone, in which at least one object located at a different capturing distance can be in focus, by a user or according to a distance from the object.

To achieve these and other advantages and in accordance with the purpose of this specification, as embodied and broadly described herein, there is provided a mobile terminal including a camera that is configured to sense objects using a plurality of lenses, a display unit that is configured to output an image received through the camera, and a controller that is configured to recognize capturing distances between the plurality of lenses and the object using sensing information on the object, generate a focal zone, defined by focal distances corresponding to some of the recognized capturing distances, and control the display unit to output an image in which at least one object included in the focal zone among the sensed objects is in focus.

In one embodiment disclosed herein, the focal zone may be defined by focal distances corresponding to a depth of field set for all or part of a user-selected region of the image output on the display unit.

In one embodiment disclosed herein, the focal zone may be formed in a shape of a stereoscopic space or a plane based on whether the depth-set portion is all or part of the selected region.

In one embodiment disclosed herein, the depth of field may be set through a user touch input applied to the selected region or through a separate graphic object for setting the depth of field.

In one embodiment disclosed herein, the controller may determine whether a touch input is applied to all or part of the selected region, on the basis of a position, strength and a duration of the user touch input applied to the selected region.

In one embodiment disclosed herein, the depth of field may be decided according to a length of a drag input applied, consecutive to a user touch input with respect to one point of the selected region.

In one embodiment disclosed herein, the controller may output a guide line in the vicinity of the focal zone. The guide line may be provided for distinguishing the generated focal zone.

In one embodiment disclosed herein, the guide line may be displayed with a different color or in a different shape to correspond to each of the plurality of focal distances defining the focal zone.

In one embodiment disclosed herein, the controller may generate the focal zone corresponding to a shape of the object based on the recognized capturing distances.

In one embodiment disclosed herein, the controller may analyze a color pattern of the image received through the camera, recognizes a composition of the object on the basis of the analyzed color pattern and the recognized capturing distances, and generate the focal zone according to the recognized composition.

In one embodiment disclosed herein, the controller may generate the focal zone using at least one of moving direction, moving path and moving velocity of a moving object when the moving object is sensed from the image received through the camera.

In one embodiment disclosed herein, the controller may change a viewing angle of the camera based on the recognized shape of the object, and generate the focal zone using sensing information on the object according to the changed viewing angle of the camera.

In one embodiment disclosed herein, the controller may change a viewing angle of the camera on the basis of the generated focal zone when the focal zone is generated.

In one embodiment disclosed herein, the controller may generate a plurality of focal zones according to a user selection, and output an image on the display unit. Here, the image may be focused on objects which have different capturing distances and are included in the plurality of focal zones generated, respectively.

In one embodiment disclosed herein, the controller may perform a face recognition for the object included in the focal zone. The controller may then display an image, in which the face-recognized object is continuously in focus, on the display unit even if the face-recognized object is moved out of the focal zone.

In one embodiment disclosed herein, the controller may lock the focal zone according to a user selection, and output an image, in which objects included in the locked focal zone are in focus, on the display unit.

In one embodiment disclosed herein, the controller may output a graphic object, which indicates the locked state of the focal zone, in the vicinity of a region of the display unit on which the focal zone is displayed.

In one embodiment disclosed herein, the controller may sense whether there is an object included in the focal zone when the focal zone is generated, and when an object included in the focal zone is present, store an image focused on the object.

In one embodiment disclosed herein, the controller may store a video, in which at least one object included in the focal zone is in focus, when the focal zone is generated.

To achieve these and other advantages and in accordance with the purpose of this specification, as embodied and broadly described herein, there is provided a control method for a mobile terminal having a camera, the method including sensing at least one object using a plurality of lenses provided in the camera, and outputting an image of the at least one object, recognizing a plurality of capturing distances between the camera and the at least one object using sensing information on the at least one object, generating a focal zone defined by focal distances corresponding to some of the plurality of capturing distances, and outputting an image focused on an object included in the focal zone of the at least one object.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The embodiments will be described in detail with reference to the following drawings in which like reference numerals refer to like elements wherein:

FIGS. 8A and 8B are exemplary views illustrating an example of generating a focal zone according to a change in a depth of field by a user, in a mobile terminal according to the present disclosure;

FIG. 9A to FIG. 9D are exemplary views illustrating examples of generating different types of focal zone according to a change in a depth of field by a user, in a mobile terminal according to the present disclosure;

FIGS. 11A to 11C are exemplary views illustrating an example of automatically generating a focal zone according to a composition of an object, in a mobile terminal according to the present disclosure;

FIG. 12 is an exemplary view illustrating an example of generating a plurality of focal zones, in a mobile terminal according to the present disclosure;

FIG. 13 is an exemplary view illustrating an example of continuously focusing on an object in a tracking manner once the object is included in a focal zone, in a mobile terminal according to the present disclosure;

FIGS. 14A and 14B are exemplary view illustrating an example of displaying an image when a user-set focal zone is fixed, in a mobile terminal according to the present disclosure; and FIG. 15 is an exemplary view illustrating an example of storing (saving) an image when an object is sensed in a user-set focal zone, in a mobile terminal according to the present disclosure.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
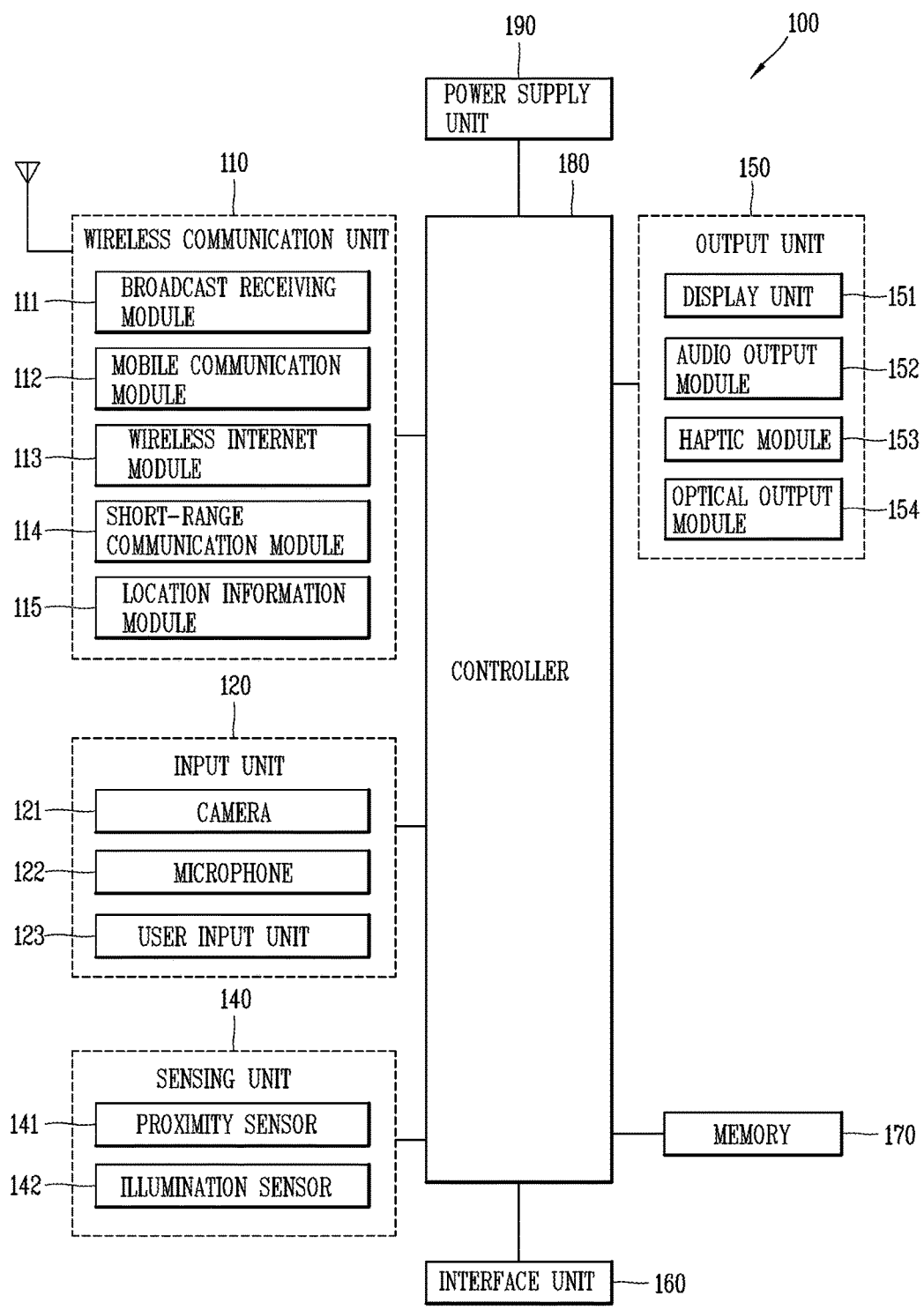
FIG. 1A is a block diagram of a mobile terminal in accordance with one exemplary embodiment of the present disclosure.
Figure 1B:
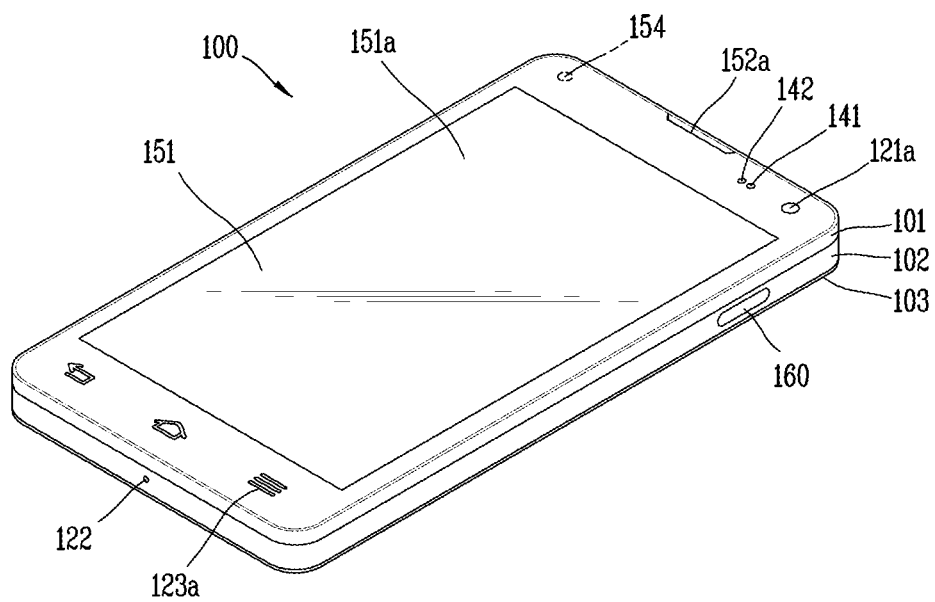
FIGS. 1B to 1D are conceptual views of an example of a mobile terminal according to the present disclosure, viewed from different directions.
Figure 1C:
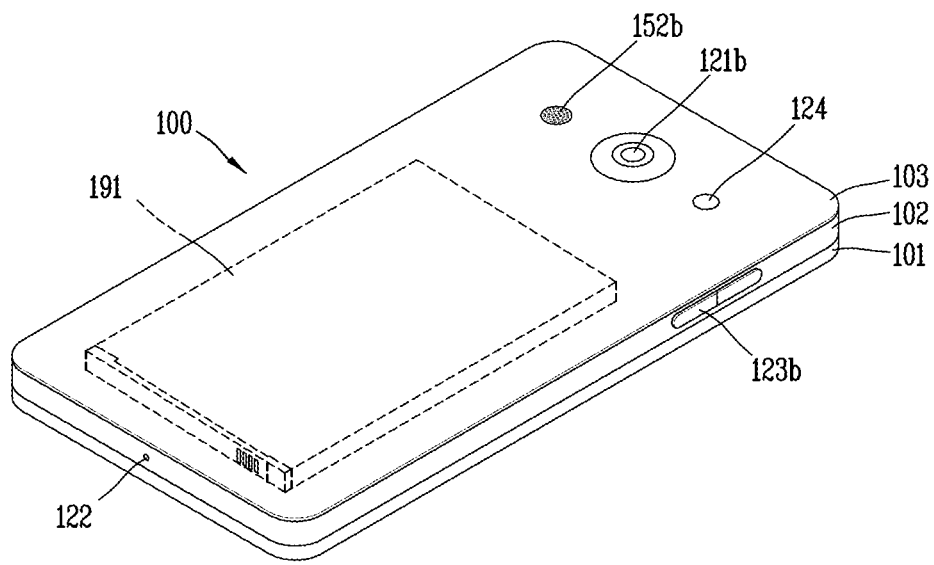

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 of the mobile terminal 100 according to the embodiment disclosed herein may further store image information related to a plurality of persons. Such image information may be a facial image corresponding to a specific person, and provided from an electronic name card received from another terminal or from a server which provides a chatting service or SNS used by a user.

The memory 170 may store the image information by further including specific information therein. For example, the memory 170 may store contact information, such as a phone number, an e-mail address and the like, to correspond to the image associated with the specific person. Here, the image information may be stored in the form of profile information, which is included in a phonebook or a directory of the mobile terminal 100.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The controller 180 of the mobile terminal 100 according to this embodiment disclosed herein may generate a focal zone using information obtained by sensing an object through the camera 121. Here, the focal zone refers to a region defined by a plurality of focal distances (focus distances or focal lengths). Namely, the focal zone refers to a region in which each of objects, when they are included in a focal zone, is in focus even though those objects have different capturing distances. Here, the capturing distance refers to a distance (or length) between an object and an image sensor (lens).

The focal zone may be defined by focal planes formed along the plurality of focal distances which are different from one another. Here, the focal plane refers to a plane on which light incident through an image sensor, namely, a lens is converged on one point. That is, the plane refers to a virtual plane which is perpendicularly spaced apart from an optical axis of the lens by a focal distance. Accordingly, when an object is located at a position corresponding to the focal plane, the object can be in focus.

The controller 180 may generate the focal zone in various manners. For example, the controller 180 may generate a focal zone, which is defined by focal distances belonging to a range from a focal distance corresponding to a capturing distance of a partial region of an image selected by a user up to a focal distance corresponding to a user-set depth of field (or depth) with respect to the image.

For example, the controller 180 may generate as the focal zone a stereoscopic space, which has an area of a region, selected by a user on an image as the focal zone, and has a depth corresponding to a user-set depth of field. Here, the stereoscopic space may be a space in which focal planes are arranged in parallel in back and forth directions. Here, the focal planes correspond to focal distances from a focal distance set as a reference, namely, a focal distance which is the same as a capturing distance corresponding to the user-selected region on an image, up to a focal distance corresponding to the user-set depth of field. When there is at least one object which is located within the stereoscopic space, namely, located between the reference focal distance and the focal distance corresponding to the user-set depth of field, the controller 180 may output an image, in which each of the at least one object is in focus, on the display unit 151. This is because the at least one object is an object which is located at a position corresponding to at least one of the focal planes constituting the stereoscopic space. The controller 180 may also generate a focal zone in a shape of a tilted plane (or surface) based on a region, which is selected by a user on an image as a focal zone. For example, after selecting a partial region of an image, when the user changes a depth of field of a part, not all, of the selected region, the controller 180 may generate the focal zone in a shape of a plane, which is tilted in one of a vertical or horizontal direction, based on the change in the depth of field by the user.

In this case, the controller 180 may form a virtual plane which connects a depth-unchanged portion and the depth-changed portion in the region currently selected by the user. The controller 180 may then recognize a focal distance (reference focal distance) corresponding to a capturing distance of the depth-unchanged portion, and a focal distance corresponding to the depth-changed portion. The controller 180 may arrange focal distances, from the reference focal distance to the focal distance corresponding to the changed depth of field, on the formed virtual plane in a long-focal distance or short-focal distance order. Here, the virtual plane which connects the depth-unchanged portion and the depth-changed portion may be formed on a partial region of the image, in which the user has selected the focal zone. The virtual plane may be formed by a plurality of focal distances.

Here, the virtual plane may seem to have a shape in which the plurality of focal planes corresponding to the plurality of focal distances are connected to one another along the formed virtual plane in left and right directions or up and down directions. Accordingly, the controller 180 may output an image, in which at least one object located on the plurality of focal planes is in focus, on the display unit 151. Thus, the controller 180 may generate, as the focal zone, the plane-shaped region tilted in the horizontal or vertical direction, as well as the stereoscopic space. Such generation of the focal zone is merely illustrative for the method of generating the focal zone, and the present disclosure may not be limited to this.

The controller 180 may automatically generate the focal zone according to a user selection or based on a distance between an object and a camera. For example, the controller 180 may decide a size of a focal zone based on a user's touch input applied to an image output on the display unit 151, and also decide a depth of field of the focal zone.

Here, the depth of field may uniformly be set to all of a currently-set focal zone (when generating a focal zone in a stereoscopic shape), or be set in a manner that at least one of an edge or an apex has a different depth of field (when generating a focal zone in a shape of a tilted plane). When the depth is set, the controller 180 may generate a focal zone defined by focal planes corresponding to focal distances corresponding to the set depth. For example, as aforementioned, the controller 180 may recognize a capturing distance corresponding to a position of an object, which is output on a user-selected region from an image currently output on the display unit 151. The controller 180 may generate a focal zone according to each of focal distances, which belong to a range from a reference focal distance, namely, a focal distance corresponding to the recognized capturing distance, to a focal distance corresponding to a depth of field set by a user's touch input. That is, when the depth of field set is deeper, a focal zone in which it is possible to focus on an object located at a position corresponding to a longer capturing distance than a capturing distance corresponding to the user-selected region on the image can be generated.

The controller 180 may also automatically generate the focal zone based on capturing distances and a composition of an object. For example, the controller 180 may recognize distances (i.e., capturing distances) between each of a plurality of lenses and an object, using information obtained by sensing the object. The controller 180 may then generate a focal zone corresponding to a plurality of focal distances according to the recognized capturing distances. That is, the controller 180 may connect focal planes having focal distances corresponding to the recognized capturing distances, respectively, in left and right or up and down directions, so as to generate a plane-shaped (or planar) focal zone. Or, the controller 180 may generate a stereoscopic focal zone using the longest capturing distance and the shortest capturing distance of the recognized capturing distances.

Or, the controller 180 may analyze an image output on the display unit 151 and recognize a display pattern of the same or similar color. The controller 180 may then recognize a composition of an object using the recognized pattern and capturing distances recognized from sensing information on the object. That is, the controller 180 may recognize whether the object is circular, oval or linear in shape or whether or not the object is tilted.

Here, the controller 180 may generate a focal zone according to the recognized composition of the object. For example, when it is determined that the object is tilted, the controller 180 may generate a plane-shaped focal zone which is tilted in a direction for compensating for (or adjusting) the tilted state, namely, tilted by the tilted angle. Or, the controller 180 may generate the focal zone based on a sensed movement of the object. For example, when a moving object is sensed, the controller 180 may automatically generate a focal zone based on a track along which the object is moving.

By use of the generated focal zone, the controller 180 of the mobile terminal 100 according to the embodiment disclosed herein can focus simultaneously on a plurality of objects which are located at various capturing distances. For example, when one object is located at a close distance to a camera and another object is located at a far distance from the camera, the controller 180 can capture an image, in which both of the objects are in focus, using the plane-shaped or stereoscopic focal zone including both of the objects.

Meanwhile, the focal zone may also be set before capturing an image as well as after capturing the image. For example, the controller 180 may set the focal zone on a preview image output on the display unit 151. When an object is sensed within the focal zone, the controller 180 may store an image in which the object is in focus.

Or, once an object is sensed within a focal zone set on the preview image, the controller 180 may control the object to be continuously focused even when the sensed object moves out of the focal zone. For example, when an object belonging to the focal zone is a person, the controller 180 may detect a portion which is recognizable as a face of the person and control an image to be focused on the person. Even when the person moves out of the focal zone, the controller 180 may control the person to be continuously focused in a face-tracking manner for the recognized face. Here, when at least two persons belong to the focal zone, those processes can be carried out for each of the persons.

Hereinafter, description will be given of components of the mobile terminal according to the one embodiment illustrated in FIG. 1, or a structure of the mobile terminal, with reference to FIGS. 1B and 1C.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side due to the touch screen or rear input unit replacing at least some functions of the first manipulation unit 123a provided on the front of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
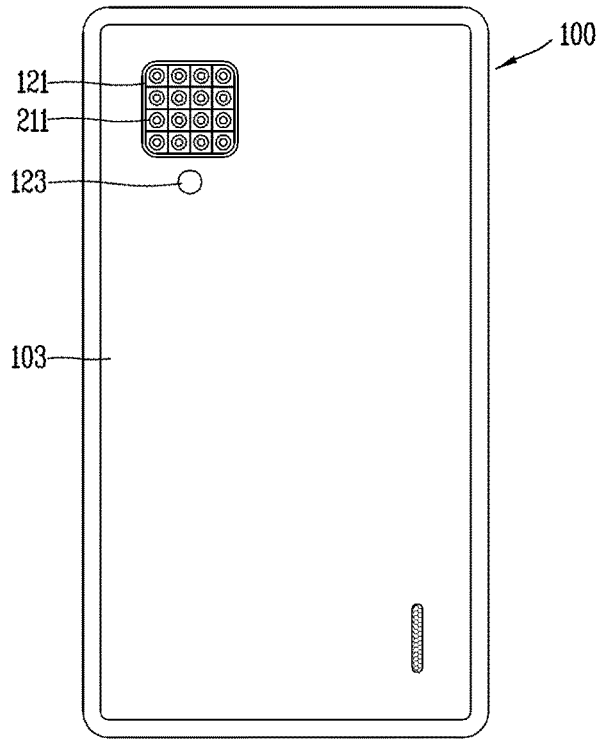

Also, the mobile terminal 100 according to one embodiment disclosed herein, which may include at least one of those aforementioned components, may include a camera 121 to capture an image including information related to a plurality of capturing distances different from one another. For example, as illustrated in FIG. 1D, the camera 121 may be implemented in a form that a plurality of lenses 211 are arranged along a plurality of lines. Accordingly, the plurality of lenses of the camera 121 can capture images of an object, respectively. The images may include different capturing distances, namely, different depth information from one another. A camera having a plurality of lenses 211 may be referred to as 'array camera.' As illustrated, the array camera may have a plurality of lenses 211 which are arranged in a matrix configuration.

The array camera, as illustrated in FIG. 1D, may include many small camera modules each of which has a lens. Each of the camera modules may have a different distance up to an object, namely, a different capturing distance (depth information). Therefore, the array camera may capture a plurality of images having a plurality of capturing distances by single capturing. The array camera may then combine (or synthesize) those images captured by the camera modules so as to obtain a high-pixel image, and also generate a three-dimensional (3D) image using parallax which is generated due to the different capturing distances. The array camera may also be controlled to set a different aperture value for each of the camera modules, such that a different amount of light can be transferred to the lens provided at each of the camera modules.

The array camera, as aforementioned, stores the plurality of images captured at the different capturing distances through the plurality of lenses. Hence, a focus (or a focal point) of the combined image may depend on a reference image.

Here, when the images captured by the respective lenses are combined based on reference images, namely, images captured by at least two lenses, an image in which focal points are equal to each other at at least two capturing distances can be generated. Accordingly, when a focal zone is generated, the controller 180 may combine those images based on an image received from at least one lens, which corresponds to at least one focal plane defining the generated focal zone, thereby obtaining a combined image in which objects included in the focal zone are in focus.

Or, the array camera may also be configured to store information related to a distance (capturing distance) up to an object in each of the images captured by the lenses, such that the distance (capturing distance) information up to the object can be included in each pixel configuring the combined image. Here, the controller 180 may generate a focal zone in the shape of the plane or the stereoscopic space according to a user-set depth of field or a composition of the object, by using those capturing distances. When there are objects whose capturing distances belong to the focal zone among objects displayed on the display unit 151, the controller 180 may control the display unit 151 to output an image in which the corresponding objects are in focus.

Hereinafter, description will be given of relevant embodiments of a control method which can be implemented in the mobile terminal having such configuration, with reference to the accompanying drawings. It may be obvious those skilled person in the art that the present disclosure can be embodied in different specific forms, without departing from the spirit and essential features of the present disclosure.

Figure 2:
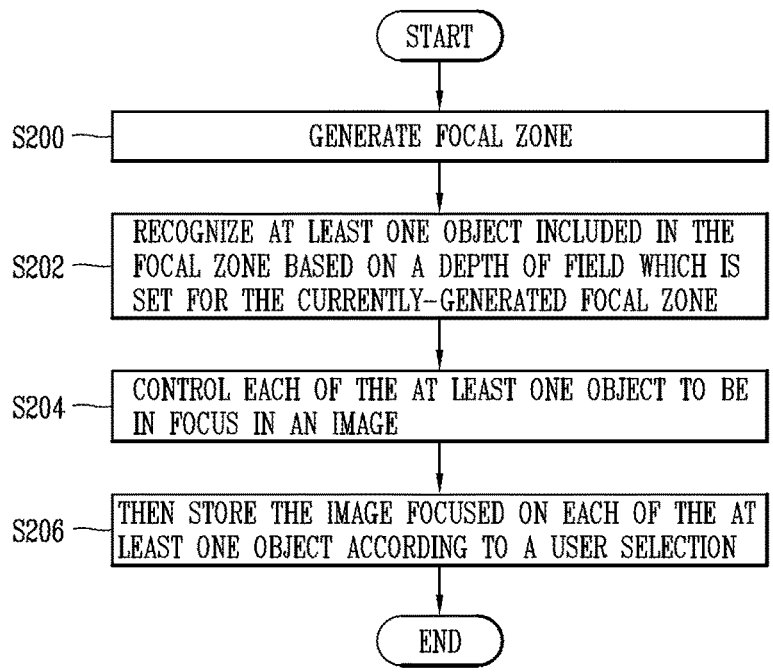
FIG. 2 is a flowchart illustrating sequential steps of generating a focal zone and capturing an image accordingly, in a mobile terminal according to the present disclosure.

FIG. 2 is a flowchart illustrating sequential steps of generating a focal zone and capturing an image accordingly, in a mobile terminal according to the present disclosure.

As illustrated in FIG. 2, the controller 180 of the mobile terminal 100 according to this embodiment disclosed herein may generate a focal zone in response to a user's selection (S200). For example, when the user selects a preset menu or graphic object for generating the focal zone, the controller 180 may generate the focal zone.

As aforementioned, the focal zone may be generated into various shapes or forms. For example, the focal zone may be generated into a shape of a stereoscopic space on a user-selected region. The focal zone in the shape of the stereoscopic space (or the stereoscopic focal zone) has a depth corresponding to a user-set depth of field (or simply referred to as a depth). Or, the focal zone may be generated into a shape of a plane on a part of the selected region. The plane-shaped focal zone (or the planar focal zone) is tilted in a horizontal or vertical direction based on a preset depth of field.

The focal zone may be generated directly by a user selection or in an automatic manner. For example, the controller 180 may select a partial region of an image output on the display unit 151 in response to a user's touch input, and generate the focal zone based on a depth of field which is set with respect to the selected region. That is, the controller 180 may recognize a capturing distance corresponding to a position of an object within the region which the user has currently selected. The controller 180 may then generate the focal zone based on each of focal distances, belonging to a range from a reference focal distance corresponding to the recognized capturing distance to a focal distance corresponding to the preset depth of field. Here, the controller 180, as aforementioned, may generate the focal zone in the shape of the plane or the stereoscopic space according to the preset depth of field. The operation process (or step) of generating the focal zone will be described later in more detail with reference to FIG. 3.

Meanwhile, the focal zone may automatically be generated according to a result that the camera 121 has sensed the object. For example, the controller 180 may automatically generate the focal zone, based on distances (capturing distances) between the object and each lens provided in the camera 121 and/or an analysis result of an image of the object. The operation of automatically generating the focal zone will be described later in more detail with reference to FIGS. 5A and 5B.

When the focal zone is generated at the step S200, the controller 180 may recognize at least one object included in the focal zone based on a depth of field which is set for the currently-generated focal zone (S202). Here, the at least one object included in the focal zone may be an object which is located on a focal plane defining the focal zone.

Here, the focal plane refers to a plane which is spaced apart from a lens by a distance that light incident through an image sensor, namely, the lens is converged onto one point, in other words, by a focus-matched distance (focal distance or focus distance), and which is perpendicular to an optical axis of the lens. Therefore, when the focal distance is equal to a capturing distance, an object located at the capturing distance may be located in the focal plane, and be in focus.

In the present disclosure, the controller 180 may generate a focal zone based on a plurality of focal distances. Here, the controller 180 may recognize an object located at a position corresponding to one of the focal distances defining the focal zone based on a distance up to the object, namely, a capturing distance. That is, when the distance up to the object, namely, the capturing distance is equal to one of the focal distances defining the focal zone, the controller 180 may recognize the object as an object included in the focal zone. Meanwhile, in spite of an object whose capturing distance is equal to one of the focal distances of the focal planes defining the focal zone, when the focal zone has a size preset by the user, the controller 180 may recognize only objects, which are output within a region in the user-preset size, as the objects included in the focal zone in the step S202.

In the step S202, when at least one object belonging to the currently-generated focal zone is recognized, the controller 180 may control each of the at least one object to be in focus in an image output on the display unit 151 (S204). The controller 180 may then store the image focused on each of the at least one object according to a user selection (S206).

That is, as aforementioned, the focal zone may be defined by the plurality of focal planes which correspond to the different focal distances. An object having a capturing distance equal to one of the focal distances may be an object located at one of the focal planes constructing the focal zone. Therefore, an image which is focused on each of the objects included in the focal zone may be output on the display unit 151 in the step S204, and the image focused on each of the objects may be stored according to the user selection in the step S206.

The foregoing embodiments has illustrated that a focal zone is generated while an image is displayed in a preview state on the display unit 151 before the image is stored, and then a focus of the image is adjusted (or compensated for) based on the generated focal zone, but the present disclosure may not be limited to this example. That is, unlike the foregoing embodiment, for a prestored image, a focal zone may be generated according to a user setting and objects included in the generated focal zone can be recognized. An image in which the recognized objects are in focus may also be output on the display unit 151.

In such a manner, the controller 180 may employ various manners to focus on at least one object based on a focal zone generated on a preview image or a prestored image. For example, the controller 180 may adjust a focus of an image based on distance values, which have been prestored in pixels of a region where the objects recognized in the step S202 are displayed. Here, the controller 180 may control the other pixels to be out of focus (outfocused), except for pixels having the prestored distance values each included in the range of being considered as being equal or similar to the distance values of pixels representing the recognized objects, within the region which has been set to the focal zone on the image.

Or, as a method of recombining images captured through the plurality of lenses provided in the camera 121, the controller 180 may allow a focus (or a focal point) to be adjusted according to the at least one object recognized in the step S202. Here, the controller 180 may recombine the images captured through the plurality of lenses, based on an image which is captured through at least one lens and is focused on each of the at least one object recognized in the step S202, among the lenses of the camera 121.

When the focal zone is generated by the user, the controller 180 may decide a shape and/or a size of the generated focal zone according to a user selection. For example, the user may set a depth of field for the focal zone, and the controller 180 may decide the shape of the focal zone according to the user-set depth of field. The controller 180 may change a position, a size and the like of the focal zone according to a user selection. Here, the user's selection and the user's setting may be decided based on a user's touch input applied to an image displayed on the display unit 151.

Figure 3:
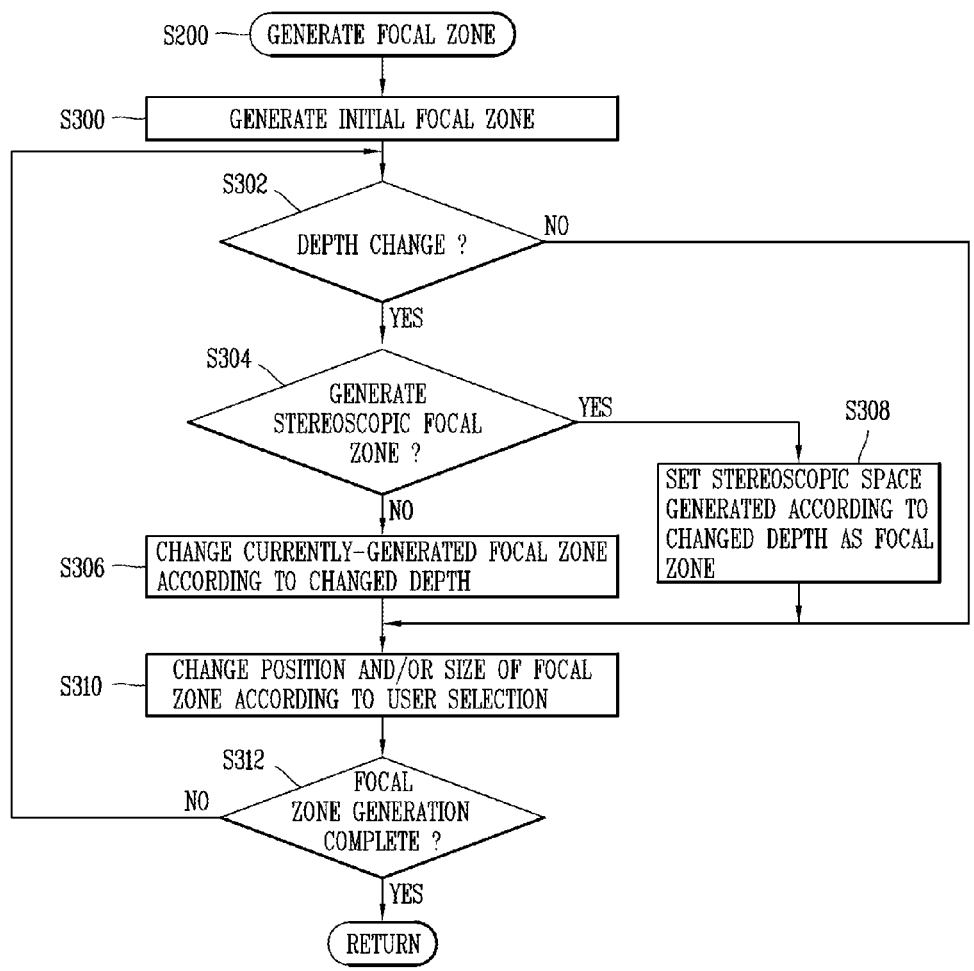
FIG. 3 is a flowchart illustrating in more detail a step of generating a focal zone among those sequential steps illustrated in FIG. 2.

FIG. 3 is a flowchart illustrating in more detail a step of generating a focal zone among those sequential steps illustrated in FIG. 2.

As illustrated in FIG. 3, the controller 180 of the mobile terminal 100 according to the embodiment disclosed herein may generate an initial focal zone when the user selects the generation of the focal zone (S300). For example, the controller 180 may determine the user selection for the generation of the focal zone when the user enters a separately-provided menu for using a focal zone, when the user applies a touch input to a separately-provided graphic object, such as a preset icon for setting a focal zone, or based on an operation pattern made by a plurality of taps applied to the display unit 151.

When it is determined that the user has selected the generation of the focal zone, the controller 180 may set the initial focal zone in various manners in the step S300. For example, in the step S300, the controller 180 may generate a region corresponding to a preset size or a preset region on the display unit 151 as the initial focal zone and indicate the generated initial focal zone on the display unit 151. Here, the initial focal zone may be indicated on the display unit 151 in a shape of a planar rectangle without a depth of field set or the like.

Or, the controller 180 may use information which is obtained by sensing an object through the camera 121 for generating the focal zone. For example, the controller 180 may recognize capturing distances between the plurality of lenses of the camera 121 and the object, respectively, and automatically generate the focal zone corresponding to a plurality of focal distances according to the recognized capturing distances.

Here, the controller 180 may connect focal planes, which correspond to the focal distances, into a focal zone in a shape of a plane, in left and right directions and/or up and down directions in a long- or short-focal distance order. The controller 180 may then define the plane-shaped focal zone as the initial focal zone. Or, the controller 180 may generate, as the initial focal zone, a focal zone in a shape of a stereoscopic space which is formed based on the longest focal distance and the shortest focal distance of the focal distances. Or, the controller 180 may recognize a display pattern of the same or similar color using an analysis result of the image output on the display unit 151, and generate the initial focal zone based on a composition of an object, which is recognized based on the recognized pattern. The operation of automatically setting the initial focal zone using the sensing result with respect to the object will be described later in more detail with reference to FIGS. 5A and 5B.

When the initial focal zone is generated, the controller 180 determines whether or not the user has changed a depth of field of the currently-generated initial focal zone (S302). For example, the controller 180 may receive the user's setting for changing the depth of field for the initial focal zone in various manners. As one example, the controller 180 may change the depth of field based on a user's touch input applied to a region, on which an edge, an apex or a plane of the generated initial focal zone is output on the display unit 151, or based on a user's touch input applied to a graphic object which is separately output in the vicinity of the currently-generated focal zone.

When it is determined in the step S302 that the user has changed the depth of field for the currently-generated focal zone, the controller 180 may determine whether or not the user has selected the focal zone to be generated into the form of the stereoscopic space, based on a user's touch input for the depth change (S304).

In the step S304, when the initial focal zone generated in the step S300 is a region for which a depth of field is not set, namely, a planar region, the controller 180 may set the depth for a part or all of the currently-generated focal zone according to a user selection. For example, when a user's touch input is applied to a plane or edge of the planar focal zone, the controller 180 may change the depth for all of the initial focal zone based on strength of the touch input or a holding time (or a duration) of the touch input.

When it is determined in the step S304 that the user's touch input for the depth change is applied to generate the focal zone in the form of the stereoscopic space, the controller 180 changes the currently-generated focal zone according to the changed depth of field (S308). For example, when the currently-generated focal zone is the initial focal zone generated in the step S300, namely, the plane-shaped zone, the controller 180 may set the depth of field for the currently-generated focal zone to a level corresponding to the user's touch input sensed in the step S302. Here, the controller 180 may generate the stereoscopic focal zone which is defined by focal distances corresponding to the currently-set depth of field. Here, the focal zone may be regarded as a space, which is defined by focal planes corresponding to focal distances, belonging to a range from a reference focal distance, which corresponds to the capturing distance of the object displayed on the region which has been set to the initial focal zone, up to a focal distance corresponding to the set depth of field. An example of the planar focal zone or the stereoscopic focal zone generating will be described later with reference to FIG. 7.

When it is determined in the step S302 that the depth of field for the initial focal zone has not been set, or when the stereoscopic focal zone has been generated in the step S308, the controller 180 may change a position and/or a size of the currently-generated focal zone according to a user selection (S310). Here, the controller 180 may change the position of the currently-generated focal zone based on a user input (for example, a touch input applied to a region of the display unit 151 corresponding to the currently-generated focal zone). Or, the controller 180 may also change an area size of the currently-generated focal zone according to a user selection.

The controller 180 then determines whether or not the focal zone has completely been generated (S312). For example, when a user input is applied to a menu or a preset graphic object for completing the generation of the focal zone or when a user input is applied to store a current image received from the camera 121, the controller 180 may determine that the user has completed the generation of the focal zone.

When it is determined in the step S312 that the generation of the focal zone has not been completed, the controller 180 may repeatedly carry out those steps from S302 to S310 until the generation of the focal zone is completed. However, when it is determined in the step S312 that the generation of the focal zone has been completed, the controller 180 may go to the step S202 (see FIG. 2) to recognize objects included in the currently-generated focal zone.

Meanwhile, when it is determined in the step S304 that the user input for the depth change is not to generate the stereoscopic focal zone, the controller 180 may change the currently-generated focal zone according to the changed depth of field (S306). For example, when the currently-generated focal zone is in the stereoscopic shape with a predetermined depth of field other than the plane shape, then the controller 180 may change the depth of field for the preset focal zone based on the user input in the step S306.

Or, the controller 180 may determine that the user's touch input for the depth change is a touch input for changing a depth for only a part, not all, of the focal zone which is currently output in the planar shape. For example, when the user touch input is applied to an edge or one apex of the planar focal zone (for example, the initial focal zone in the step S300), the controller 180 may determine that the user's touch input is applied to change the depth for only the edge or apex portion.

Here, the controller 180 may change the currently-generated focal zone into a planar focal zone, which is tilted in one of horizontal and vertical directions, based on the change in the depth for the partial portion. For example, the focal zone in the shape of the tilted plane may be formed in a shape tilted by a predetermined angle based on the changed depth for the part of the region, which has been set to the initial focal zone. Also, the planar focal zone may be formed in a manner of connecting focal planes, which correspond to the focal distances from a focal distance of a depth-unchanged portion of the focal zone to a focal distance of the depth-changed portion of the focal zone, into a linear form along left and right or up and down directions. An example of the planar focal zone, which is tilted in one of horizontal and vertical directions, will be described later with reference to FIG. 9.

When the focal zone has changed based on the changed depth of field in the step S306, the controller 180 may go to the step S310 to change the size and/or position of the currently-generated focal zone according to a user selection. For example, after the user touch input applied to the currently-generated focal zone is sensed, when a drag input consecutive to the touch input is sensed, the controller 180 may change the position of the currently-generated focal zone in response to the drag input. The controller 180 may determine whether or not the generation of the focal zone has been completed in the step S312, and then go back to the step S302 to sense whether or not the user has changed the depth of field or back to the step S202 to recognize at least one object included in the currently-generated focal zone.

When the focal zone is generated through those steps illustrated in FIG. 3, the controller 180 may indicate (output, display) the currently-generated focal zone in a manner of being distinctive from the other region of the display unit 151. In addition, the controller 180 may display the focal zone differently according to each of the focal distances.

Figure 4:
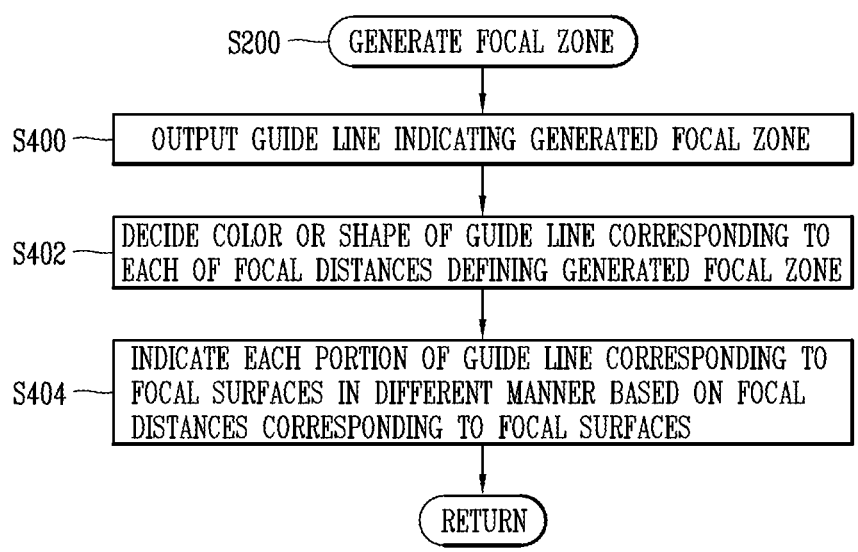
FIG. 4 is a flowchart illustrating a step of displaying a generated focal zone when the focal zone is generated, among those sequential steps illustrated in FIG. 2.

FIG. 4 illustrates a process (or step) of distinctively outputting (indicating) the generated focal zone when the focal zone is generated.

As illustrated in FIG. 4, the controller 180 of the mobile terminal 100 according to the embodiment disclosed herein may display a graphic object, such as a guide line, in the vicinity of (adjacent to) the currently-generated focal zone (S400). Here, the focal zone may be distinguished from the other region of the display unit 151 based on the guide line. When the focal zone has been changed through the steps illustrated in FIG. 3, the controller 180 may output the guide line around the changed focal zone so as to indicate the changed state of the focal zone on the display unit 151.

The controller 180 may decide a color or shape of a guide line, which corresponds to each of focal distances defining the currently-generated focal zone (S402). For example, the controller 180 may recognize the focal distances for defining the currently-generated focal zone, and decide guide lines having different colors or shapes to correspond to the recognized focal distances, respectively.

The controller 180 may divide the guide line into a plurality of regions based on each focal distance, and output the divided regions using different colors or shapes according to the corresponding focal distances, respectively (S404). An example of the guide line around the focal zone will be described later with reference to FIG. 10.

Accordingly, the controller 180 may distinctively display (or indicate) the different focal distances, which belong to a range from a reference focal distance, namely, a focal distance corresponding to a user-selected region to a focal distance corresponding to a user-set depth of field, in different colors or shapes. This may allow the user to identify the color or shape of the guide line so as to recognize the focal distance corresponding to the user-set depth for the focal zone and thusly set (generate) the focal zone more accurately.

Figure 5A:
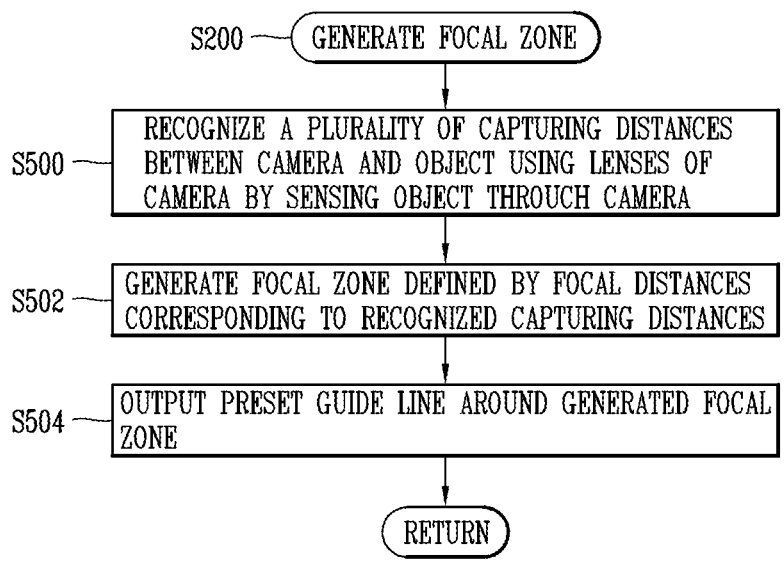
FIGS. 5A and 5B are flowcharts illustrating a step of automatically generating a focal zone by recognizing a distance from an object, among sequential steps illustrated in FIG. 2.
Figure 5B:
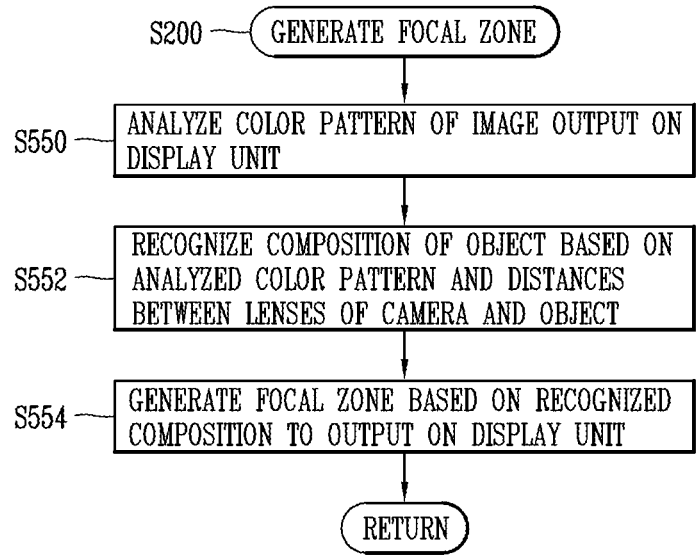

It has been mentioned that the controller 180 of the mobile terminal 100 according to the embodiment disclosed herein can recognize a capturing distance from an object and/or a composition of an object upon a generation of a focal zone. FIGS. 5A and 5B illustrate a step of automatically generating a focal zone by recognizing a distance from an object and/or a composition of the object, among the sequential steps illustrated in FIG. 2.

As illustrated in FIG. 5A, when the generation of the initial focal zone is started in the step S300, the controller 180 of the mobile terminal 100 according to the embodiment disclosed herein senses an object through the camera 121, and recognizes a plurality of capturing distances between the camera 121 and the object using the plurality of lenses of the camera 121 (S500). For example, the controller 180 may recognize at least one capturing distance by sensing a distance from the object to each of the plurality of lenses of the camera 121.

When the plurality of capturing distances are recognized in the step S500, the controller 180 may generate the focal zone which is defined by focal distances corresponding to the recognized capturing distances (S502). For example, in the step S502, the controller 180 may set a partial region of an image, in which the object is fully displayed, and decide a depth of field for the set region using the longest capturing distance and the shortest capturing distance among the recognized capturing distances. That is, the controller 180 may recognize a focal distance (first focal distance) corresponding to the longest capturing distance and a focal distance (second focal distance) corresponding to the shortest capturing distance, and decide a difference between the first focal distance and the second focal distance as a depth of field. Here, the controller 180 may generate the focal zone using a plurality of focal distances, which belong to a range from one of the first focal distance and the second focal distance to the other.

The thusly-generated focal zone may have various forms or shapes. For example, the controller 180 may generate the focal zone into a shape of a plane or a stereoscopic space (i.e., a planar focal zone or stereoscopic focal zone) based on the recognized capturing distances. For example, the controller 180 may generate the focal zone, which is in the shape of the stereoscopic space having a depth corresponding to the difference between the first and second focal distances, on the currently-set partial region (the partial region of the image on which the objects are all displayed). Or, the controller 180 may generate a plane which connects a region corresponding to the first focal zone and a region corresponding to the second focal distance on the currently-set partial region, and generate the focal zone into the shape of the plane by arranging on the generated plane the plurality of focal distances between one of the first and second focal distances and the other.

Once the focal zone is generated, the generated focal zone may be distinctively output on the display unit 151 (S504). For example, the controller 180 may output a preset guide line adjacent to the generated focal zone. Here, the guide line, as illustrated in FIG. 4, may be output on the display unit 151 with a different color or in a different shape according to each of the focal distances defining the focal zone.

The controller 180 of the mobile terminal 100 according to the embodiment disclosed herein may also generate the focal zone using an analysis result of the image output on the display unit 151, as well as using the distances, namely, the capturing distances from the object.

For example, when the generation of the initial focal zone is started in the step S300, the controller 180 may further use the analysis result of the image output on the display unit 151, as well as the plurality of capturing distances between the camera 121 and the object, recognized by the plurality of lenses of the camera 121 (S550). For example, the controller 180 may analyze a color pattern of the image output on the display unit 151 and use the analyzed color pattern.

Here, the controller 180 may recognize the composition of the object based on the color pattern of the image analyzed in the step S300 and the recognized capturing distances (S552). For example, the controller 180 may recognize a tilt state or a shape of the object based on the recognized capturing distances and the analyzed color pattern of the image. And, the composition of the current object may thusly be recognized using the recognized result.

When the composition of the object is recognized in the step S552, the controller 180 may generate a focal zone which is the most appropriate for the object according to the recognized composition (S554). For example, when it is determined in view of the composition that the object is tilted in a horizontal or vertical direction, the controller 180 may generate the focal zone in a direction for compensating for (or adjusting) the tilt state. That is, when the object is tilted, the controller 180 may set a short focal distance for a portion of the object close to the camera 121, namely, a region with a short capturing distance, and a long focal distance for a portion of the object far away from the camera 121, namely, a region with a long capturing distance, in the image with the object displayed, on the basis of the tilt state of the object. Accordingly, the controller 180 may automatically generate a planar focal zone, which is inclined by the same angle as the tilt angle of the object in the step S554. The generated focal zone may thusly be output as the initial focal zone on the display unit 151 in the step S300. An example of the planar focal zone, which is inclined by the same angle as the tilt angle of the object will be described later with reference to FIG. 11B.

Meanwhile, the foregoing description has been given of the example of recognizing the composition of the object by considering the tilt angle of the object. However, the present disclosure may also be configured to sense a tilt state of the camera 121 and further reflect the sensed result to recognize the composition. Here, after analyzing the image, the controller 180 may recognize the composition of the object by considering all of the image-analyzed result, namely, the analyzed color pattern of the image, the capturing distances from the object, and the tilt state of the mobile terminal 100. Here, the tilt degree (or level) of the camera 121 may be the tilt degree of the mobile terminal 100, and this may be measured by use of a gyro sensor and the like included in the sensing unit 140.

The foregoing description has also been given of the example of analyzing the image, namely, analyzing the color pattern of the image output on the display unit 151, but the present disclosure may not be limited to this. That is, the present disclosure can use various types of information as well as the color pattern in order to analyze the image output on the display unit 151 and generate the focal zone using the analyzed result.

For example, the controller 180 may sense a movement of the object on the image output on the display unit 151. Here, the controller 180 may generate the focal zone based on a moving track (path) and a moving velocity of the object. That is, for capturing a runner who is running on a preset running track, the controller 180 may recognize a moving track (path), a moving velocity and a moving direction of the player based on an analysis result of the image in the preview state, and then generate the focal zone using the recognized results. In this case, the controller 180 may recognize a composition of the running track based on a color pattern of the image output on the display unit 151. The controller 180 may then generate a focal zone (for example, a planar focal zone crossing the running track) based on the recognized results, such as the composition of the running track, and the moving path and moving direction of the runner. An example of the focal zone generating based on the running track, and the moving path and moving direction of the runner, will be described later with reference to FIG. 11C.

Meanwhile, the foregoing description has been merely given of generating the focal zone according to the composition of the object. However, in addition to this, a viewing angle of the camera 121 may also be changeable according to the recognized composition of the object. Here, the controller 180 may change the viewing angle of the camera 121 according to the recognized composition of the object, such that the object can be captured by the camera 121 in a more appropriate direction. For example, the controller 180 may change the viewing angle of the camera 121 to compensate for the tilt state of the object as much as possible according to the recognized composition of the object. That is, when the object is in a state that an upper portion of the object has a shorter capturing distance than a lower portion thereof, namely, the object is tilted forward, the controller 180 may change the viewing angle of the camera 121 in a manner of compensating for the state of the object as much as possible. In other words, when the object is tilted forward, the controller 180 may change the viewing angle of the camera 121 such that the image of the object can be received in the camera 121 at a lower angle. Here, the viewing angle of the camera 121 may be changeable according to which image is set to a reference image among images received from the plurality of lenses of the camera 121.

Figure 6:
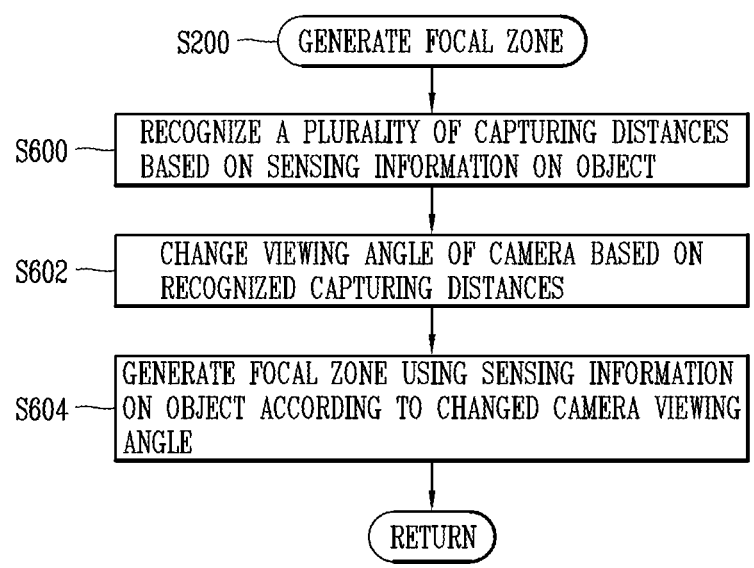
FIG. 6 is a flowchart illustrating a step of compensating for (or adjusting) a viewing angle of a camera according to a composition of an object, in a mobile terminal according to the present disclosure.

FIG. 6 is a flowchart illustrating a step of compensating for a viewing angle of a camera according to a composition of an object, in a mobile terminal according to the present disclosure.

As illustrated in FIG. 6, when the generation of the focal zone is selected in the step S200, the controller 180 recognizes a plurality of capturing distances from an object by using information obtained by sensing the object through the camera 121 (S600). For example, the controller 180 may recognize the plurality of capturing distances using a plurality of lenses of the camera 121.

When the capturing distances are recognized in the step S600, the controller 180 may change a viewing angle of the camera 121 based on the recognized capturing distances (S602). For example, the controller 180 may recognize the composition of the object, namely, a tilt state of the object or a tilt direction of the object based on the recognized capturing distances. Here, the controller 180 may change the viewing angle of the camera 121 based on the recognition result of the tilt state or the tilt direction of the object. That is, when it is assumed that the upper portion of the object is tilted toward the camera 121 (i.e., tilted to the front of the camera 121), the controller 180 may combine (synthesize) images received from the plurality of lenses, based on an image, which is viewed at a viewing angle at which the object can be viewed more straightly, namely, an image received from a lens located below a central lens among the plurality of lenses arranged in the matrix configuration. The controller 180 may then output the combined image on the display unit 151, and generate a focal zone according to a user selection on the image obtained at the changed viewing angle of the camera 121.

FIG. 6 has illustrated the example of changing the viewing angle of the camera 121 using the object-sensing result prior to forming the focal zone, and then generating the focal zone on the image output on the display unit 151 according to the changed viewing angle of the camera 121. However, a process carried out in the reverse order to this may also be enabled.

That is, when the focal zone is set on the image output on the display unit 151 based on the composition of the object or the user selection, the controller 180 may change the viewing angle of the camera 121 based on the set focal zone. For example, in case where a planar focal zone which is inclined in a horizontal or vertical direction is generated on an image in a preview state, output on the display unit 151, when the user selects a storage (saving) of the image, the controller 180 may change a viewing angle of the camera 121 based on the shape of the generated focal zone, and then capture the image according to the changed viewing angle. In this case, the preview image output on the display unit 151 may be an image without the change in the viewing angle, but the stored image may be an image with the viewing angel compensated for according to the user-set focal zone.

So far, the detailed description has been given of those steps of generating a focal zone in various forms according to a user selection and capturing an image focused on an object included in the generated focal zone, in the mobile terminal according to the embodiment disclosed herein, with reference to those flowcharts.

Hereinafter, description will be given of an example of generating a focal zone defined by a plurality of focal distances according to a user selection, and storing an image captured by focusing on at least one object based on the generated focal zone, with reference to exemplary views.

FIG. 7A to FIG. 7D are exemplary views illustrating examples of capturing an image which are focused according to a generated focal zone, in a mobile terminal according to the present disclosure.

Figure 7A:
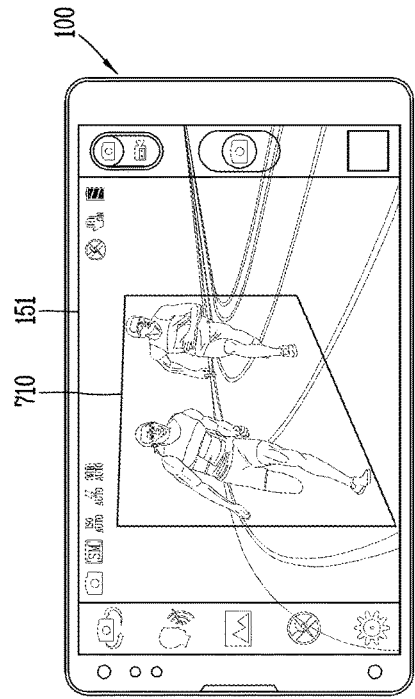
FIG. 7A to FIG. 7D are exemplary views illustrating examples of capturing an image which are focused according to a generated focal zone, in a mobile terminal according to the present disclosure.

As illustrated in FIG. 7A, an example in which an initial focal zone is generated is illustrated. For example, the controller 180 may output an image received from the camera 121 in a preview state on the display unit 151, as illustrated in FIG. 7A. Here, the image output on the display unit 151 may be an image which is generated by combining images received from a plurality of lenses of the camera 121.

When a user's selection with respect to the preview image is received, for example, when a plurality of taps corresponding to a preset operation pattern is sensed or a preset menu or graphic object for generating a focal zone is selected by the user, the controller 180, as illustrated in FIG. 7A, may generate an initial focal zone 700. The initial focal zone 700 may be generated in a preset size or in a shape of a planar rectangle output on a specific region of the display unit 151. When the initial focal zone 700 is generated as illustrated in FIG. 7A, the controller 180 may output an image which is focused only on an object, namely, a first object 702 included in the initial focal zone 700.

In this state, the controller 180 may change the initial focal zone 700 according to a user selection. For example, the controller 180 may change the initial focal zone 700 into a planar focal zone inclined in a vertical or horizontal direction or a stereoscopic focal zone, on the basis of a depth set by the user for the focal zone.

Figure 7B:
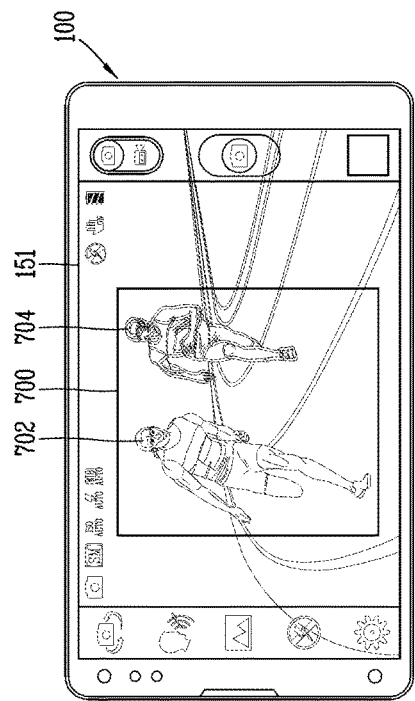

For example, when a depth of field for a part of the region which has been currently set as the focal zone is changed, the controller 180, as illustrated in FIG. 7B, may generate a planar focal zone 710 inclined in a vertical or horizontal direction. When a user's touch input is applied to a part of an edge portion of the region currently set as the focal zone, namely, to one edge or apex while the planar rectangular focal zone is displayed as illustrated in FIG. 7A, the controller 180 may recognize that a depth change has been selected for the portion of the region currently set as the focal zone.

Here, the controller 180, as illustrated in FIG. 7B, forms a tilted virtual plane which connects a depth-unchanged portion and a depth-changed portion in the focal zone 700, and recognize a focal distance (first focal distance) corresponding to the depth-unchanged portion and a focal distance (second focal distance) corresponding to the depth-changed portion. The controller 180 may then arrange a plurality of focal distances, which belong to a range from the first focal distance to the second focal distance, on the virtual plane, in a long-focal distance order or a short-focal distance order.

In this case, focal planes which correspond to the focal distances, respectively, may be connected along the virtual plane in left and right directions. Accordingly, the focal zone, such as the focal zone 710 as illustrated in FIG. 7B, may be generated into a planar shape tilted in a specific direction. Therefore, an image, which is focused on objects at positions corresponding to a display position of the focal zone 710, namely, the tilted plane, may be output on the display unit 151. Thus, an image which is focused on both of a first object 702 and a second object 704, as illustrated in FIG. 7B, may be output on the display unit 151 of the mobile terminal 100 according to the embodiment disclosed herein.

As illustrated in FIG. 7B, when a depth change is selected for all of the currently-set focal zone, other than a part of the currently-set focal zone, the controller 180 may generate a stereoscopic focal zone having a depth of field corresponding to the changed depth on the basis of the region which has been currently set as the focal zone. For example, when a user's touch input is applied to a separate graphic object for setting a depth for a plane portion or all of the focal zone 700, the controller 180 may determine the touch input as a touch input for changing the depth for all of the currently-set focal zone.

Figure 7C:
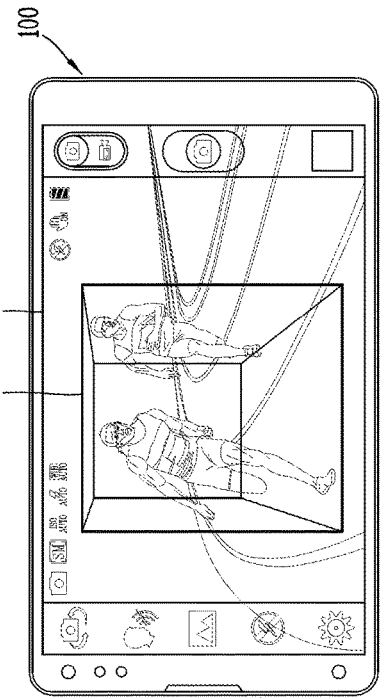

Accordingly, the controller 180, as illustrated in FIG. 7C, may generate a stereoscopic focal zone 720 having a depth corresponding to the user-set depth of field. Therefore, the controller 180 may control the display unit 151 to output an image, which is focused on each of objects included in the stereoscopic focal zone 720.

Figure 7D:
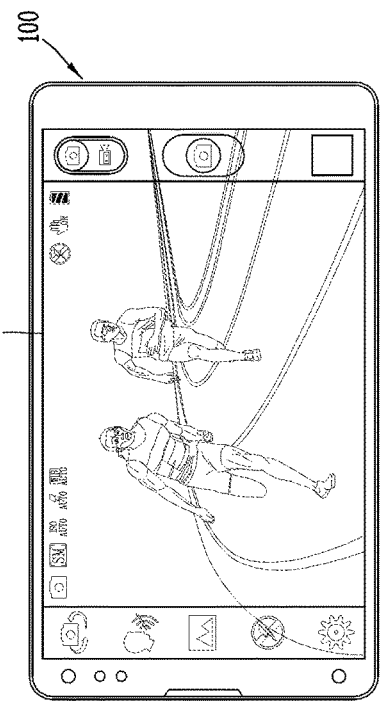

Consequently, even without a change in a composition or posture that the user captures the objects, the focal zone can be generated as illustrated in FIG. 7B and FIG. 7C, and an image which is focused on each of the objects located at different capturing distances can be output on the display unit 151. When the user selects a storage of the image, as illustrated in FIG. 7D an image which is focused only on those objects included in the focal zone can be stored.

Meanwhile, it has been mentioned that the controller 180 of the mobile terminal 100 according to the embodiment disclosed herein may allow the user to set (or select) a depth change for all of the currently-set focal zone in various manners.

Figure 8A:
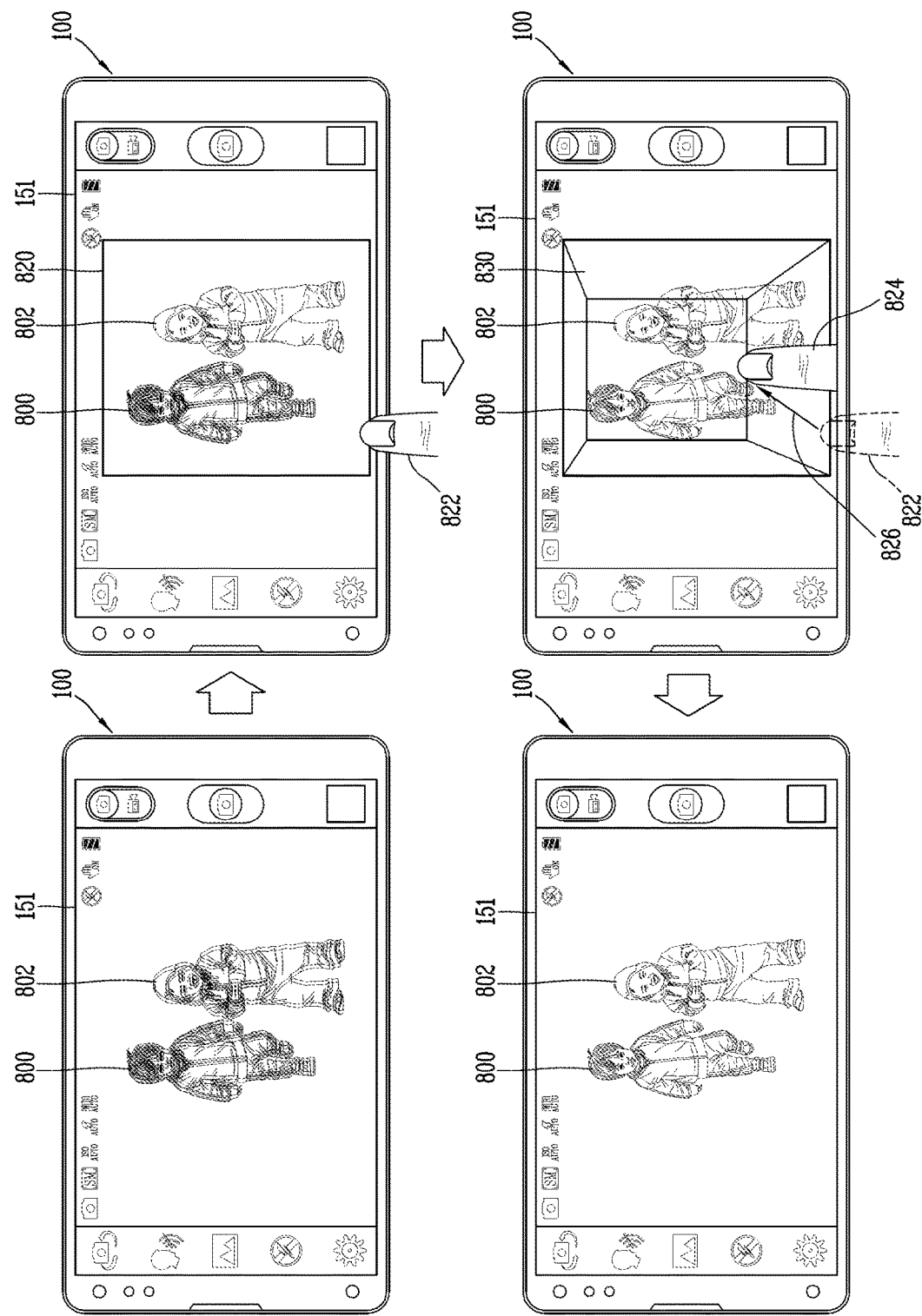

FIGS. 8A and 8B are exemplary views illustrating an example of generating a depth of field for a focal zone according to a user selection, in a mobile terminal according to the present disclosure.

For example, the controller 180 may determine whether the user has selected a depth change for all or part of the focal zone, according to a user's touch input applied to a region of the display unit 151 on which the focal zone is displayed. For example, the controller 180 may determine the selection of the depth change for part or all of the focal zone based on a point to which the user's touch input is applied on the focal zone displayed on the display unit 151. That is, when the user's touch input is applied to a portion, for example, an edge or apex of the focal zone output on the display unit 151, the controller 180 may recognize the touch input as a touch input for changing the depth for the part of the currently-set focal zone. Or, when the user's touch input is applied to a plane portion of the focal zone displayed on the display unit 151, the controller 180 may determine the touch input as a touch input for changing the depth for all of the currently-set focal zone.

Or, the controller 180 may determine whether the currently-selected depth change is for all or part of the focal zone, according to a touch input-applied state other than a touch input-applied point. That is, when the user selects an apex of the currently-set focal zone and applies a drag input toward a center of the focal zone, the controller 180 may determine that the user's touch input is applied to change the depth for the entire focal zone. On the other hand, when the user selects an edge of the currently-set focal zone and applies a drag input toward the center of the focal zone, the controller 180 may determine the user's touch input as a touch input for changing the depth for the part of the focal zone.

FIG. 8A illustrates an example of setting a depth of field in response to a user's touch input and generating a stereoscopic focal zone based on the set depth of field in the aforementioned case.

For example, as illustrated in the first drawing of FIG. 8A, while a preview image is displayed, the controller 180 may generate a focal zone according to a user selection. Here, as illustrated in the second drawing of FIG. 8A, a focal zone 820 may be generated in the vicinity of a region on which objects are displayed. The controller 180 may output an image which is focused only on an object 802 included in the currently-set focal zone 820 on the display unit 151.

Meanwhile, while a touch input 822 is applied to a specific portion of the currently-generated focal zone 820, when the user applies a drag input 826, the controller 180 may determine the user's touch input, namely, the touch & drag, as a touch input for setting a depth of field for the entire currently-generated focal zone. For example, if it is assumed that the specific portion is an edge portion of the focal zone 820, the controller 180, as illustrated in the third drawing of FIG. 8A, may decide the depth for the entire focal zone 820 based on a dragged length of the drag input 826, and generate a stereoscopic focal zone 830 having a depth corresponding to the decided depth of field.

Here, when the objects 800 and 802 all belong to a region where the stereoscopic focal zone 830 is displayed, as illustrated in the third drawing of FIG. 8A, both of the objects 800 and 802 may be in focus. Under this state, when the user selects a storage of an image, as illustrated in the fourth drawing of FIG. 8A, an image which is focused on both of the objects 800 and 802 may be stored.

Unlike this, a graphic object for setting the depth of field may be used separately. For example, while the preview image is output as illustrated in the first drawing of FIG. 8B, when the generation of the focal zone is selected by the user, the controller 180, as illustrated in the second drawing of FIG. 8B, may output a graphic object 850 for allowing the user to set a depth of field on the display unit, as well as the initial focal zone 820. When a user's touch input 852 is applied to the graphic object 850, the controller 180 may set the depth of field for the currently-set focal zone 820.

For example, as illustrated in the third drawing of FIG. 8B, when a drag input 854 is applied consecutive to the touch input 852, the controller 180 may set the depth of field for the entire focal zone 820 as deep as a length of the drag input 854. Here, the controller 180 may generate a stereoscopic focal zone 830 having a depth corresponding to the set depth of field. When both of the objects 800 and 802 belong to the region where the stereoscopic focal zone 830 is displayed, as illustrated in the third drawing of FIG. 8B, both of the objects 800 and 802 may be in focus. Under this state, when the user selects a storage of an image, as illustrated in the fourth drawing of FIG. 8B, an image which is focused on both of the objects 800 and 802 may be stored.

Meanwhile, the controller 180 of the mobile terminal 100 according to the embodiment disclosed herein, as illustrated in FIGS. 8A and 8B, may also generate the focal zone in the tilted planar shape as well as the stereoscopic shape.

FIG. 9A to FIG. 9D are exemplary views illustrating examples of generating different types of focal zone according to a change in a depth of field by a user, in a mobile terminal according to the present disclosure.

As illustrated in FIG. 9A, while a preview image is displayed, the controller 180 may generate a focal zone according to a user selection. Here, as illustrated in FIG. 9B, a focal zone 910 may be generated, and an image which is focused on a first object 900 included in the generated focal zone 910 may be displayed on the display unit 151.

The controller 180 may change a depth of field for the focal zone 910 based on a user's touch input 912 applied to the generated focal zone 910. For example, when the touch input 912 is applied to a specific region of the currently-generated focal zone 910, the controller 180 may recognize the touch input as a touch input for changing a depth of field for a part of the focal zone 910. The specific portion, as illustrated in FIG. 9B or FIG. 9D, may be an edge portion of the focal zone 910.

Meanwhile, when a touch input applied to the edge portion of the focal zone 910 is recognized as a touch input for changing the depth of field for the partial region of the focal zone 910, the controller 180 may recognize a touch input, which is applied to the other region except for the edge portion of the focal zone 910, as a touch input for changing a depth of field for the entire region of the focal zone 910. For example, when the user touches a region of an image corresponding to the focal zone 910, the controller 180 may recognize the touch input as a touch input for changing the depth of field for the entire focal zone 910. Or, when a touch input is sensed, the controller 180 may determine whether the touch input is a touch input for changing the depth of field for all of the focal zone 910 or a touch input for changing the depth of field for part of the focal zone 910, based on a duration of the touch input, pressure of the touch input, or the like.

Meanwhile, when the touch input is determined as one for changing the depth of field for the part of the focal zone 910, the controller 180 may change the depth of field for the part of the focal zone 910 based on the touch input.

That is, as illustrated in FIG. 9C, when the user applies a drag input consecutive to a touch input 912, the controller 180 may determine that a depth of field for an edge portion of the focal zone 910 with the touch input 912 applied thereto has been changed as deep as a length of the applied drag input. Here, the controller 180 may form a virtual plane which connects the depth-changed portion and a depth-unchanged portion, and generate a planar focal zone 920, which is defined based on a plurality of focal distances different from one another, along the virtual plane. Accordingly, as illustrated in FIG. 9C, the controller 180 may generate the focal zone 920 in a tilted planar shape, and output an image which is focused on each of objects 900 and 902 included in the focal zone 920 on the display unit 151.

Meanwhile, the tilted planar focal zone 920 may be generated in a direction that the user's drag input is applied. That is, while the focal zone 910 is displayed as illustrated in FIG. 9B, when the user's touch input 912 is applied to the edge portion of the focal zone 910, the controller 180 may generate the planar focal zone tilted along the direction of the drag input which is applied consecutive to the user's touch input 912.

That is, as illustrated in FIG. 9D, when the user's drag input is applied consecutive to the touch input 912, the controller 180 may form the virtual plane along the direction that the user's drag input is applied, and generate the planar focal zone 920 defined the plurality of different focal distances along the virtual plane. Accordingly, as illustrated in FIG. 9D, the controller 180 may generate the tilted planar focal zone 920, and output an image which is focused on each of the objects 900 and 902 included in the focal zone 920 on the display unit 151.

Meanwhile, as aforementioned, when the focal zone is generated, the controller 180 of the mobile terminal 100 according to the embodiment disclosed herein can display the generated focal zone to be distinguished from the other region in various manners. For example, the controller 180 may output a guide line around the focal zone such that the focal zone can be distinguished from the other region of the display unit 151, or display the focal zone with a different color from the other region.

In addition, as aforementioned, the controller 180 may display the plurality of focal distances defining the focal zone in various manners. That is, the controller 180 may display information related to the focal distances defining the current focal zone by use of a separate graphic object, or allow the user to recognize the information related to the focal distances defining the currently-generated focal zone by displaying a guide line indicating the focal zone using a plurality of colors or shapes which are different from one another.

Figure 10A:
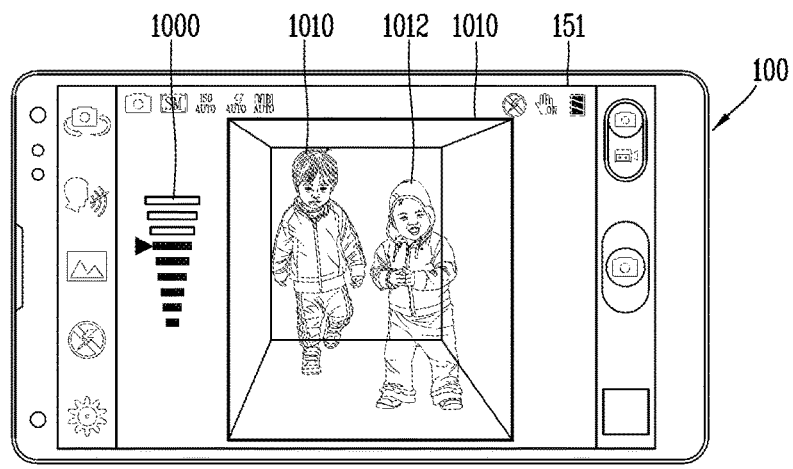
FIG. 10A to FIG. 10C are exemplary views illustrating examples of displaying generated focal zones according to a capturing distance, in a mobile terminal according to the present disclosure.

For example, as illustrated in FIG. 10A, when a focal zone 1010 (for example, a stereoscopic focal zone or a tilted planar focal zone) defined by the plurality of focal distances is generated, the controller 180 of the mobile terminal 100 according to the embodiment disclosed herein may display a graphic object 1000, which indicates a depth for the currently-generated focal zone 1010, in the vicinity of the focal zone 1010. Here, the separate graphic object 100 may indicate information corresponding to the depth for the currently-generated focal zone 1010, and accordingly the user can visually check the focal distance of the currently-generated focal zone 1010.

Meanwhile, unlike FIG. 10A, the controller 180 may also indicate the depth of the focal zone using a guide line which indicates the focal zone, without a separate graphic object.

Figure 10B:
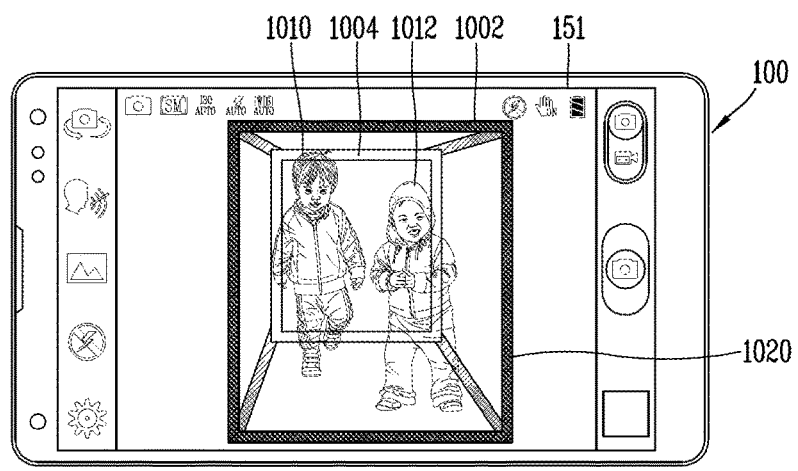

For example, as illustrated in FIG. 10B, when a stereoscopic focal zone 1020 is generated, the controller 180 may divide a guide line indicating the focal zone 1020 into a plurality of regions on the basis of focal distances defining the focal zone 1020, and display each region with a different color or in a different shape. Accordingly, as illustrated in FIG. 10B, the guide line indicating the focal zone 1020 may be displayed with different colors according to the focal distances. Here, when a darker color is set to a shorter focal distance and a brighter color is set to a longer focal distance, the controller 180, as illustrated in FIG. 10B, may set the darkest color to a guide line region 1002 in the vicinity of the focal zone corresponding to the shortest focal distance, and the brightest color to a guide line region 1004 in the vicinity of the focal zone corresponding to the longest focal distance.

Figure 10C:
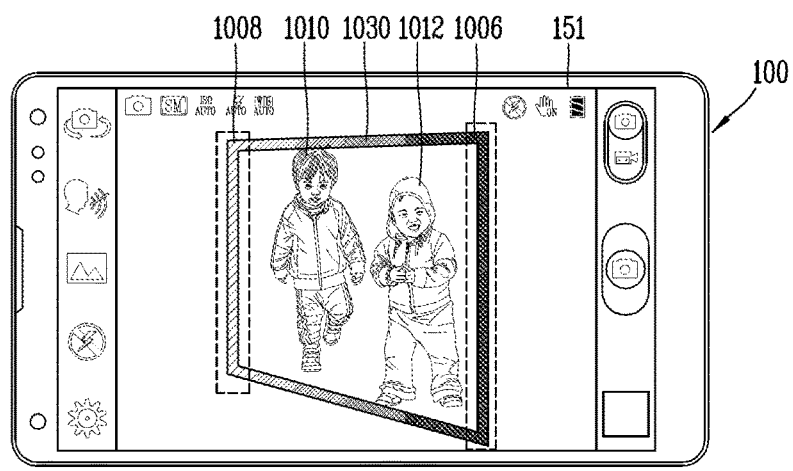

Meanwhile, as illustrated in FIG. 10B, even when the focal zone is not stereoscopic, it may be possible to display a guide line for indicating the focal zone with a different color corresponding to each focal distance through such process. That is, as illustrated in FIG. 10C, similar to the above example, for a focal zone 1030 which is generated in a tilted planar shape, when a darker color is set to a shorter focal distance and a brighter color is set to a longer focal distance, the controller 180 may display a guide line 1006, which is in the vicinity of the focal zone corresponding to the shortest focal distance, with the darkest color, and a guide line, which is in the vicinity of the focal zone corresponding to the longest focal distance, with the brightest color.

As aforementioned, when the generation of the focal zone is selected by the user, the controller 180 of the mobile terminal 100 according to the embodiment disclosed herein may generate the initial focal zone and output it on the display unit 151. It has also been mentioned that the initial focal zone can be a region in a preset size or in a shape of a planar rectangle corresponding to a preset region on the display unit 151. However, unlike this, the controller 180 of the mobile terminal 100 may also preset an optimal focal zone based on a distance between the camera 121 and the object, namely, the capturing distance, or a composition of an object, which is recognized according to an analysis result of an image displayed in a preview state.

Figure 11B:
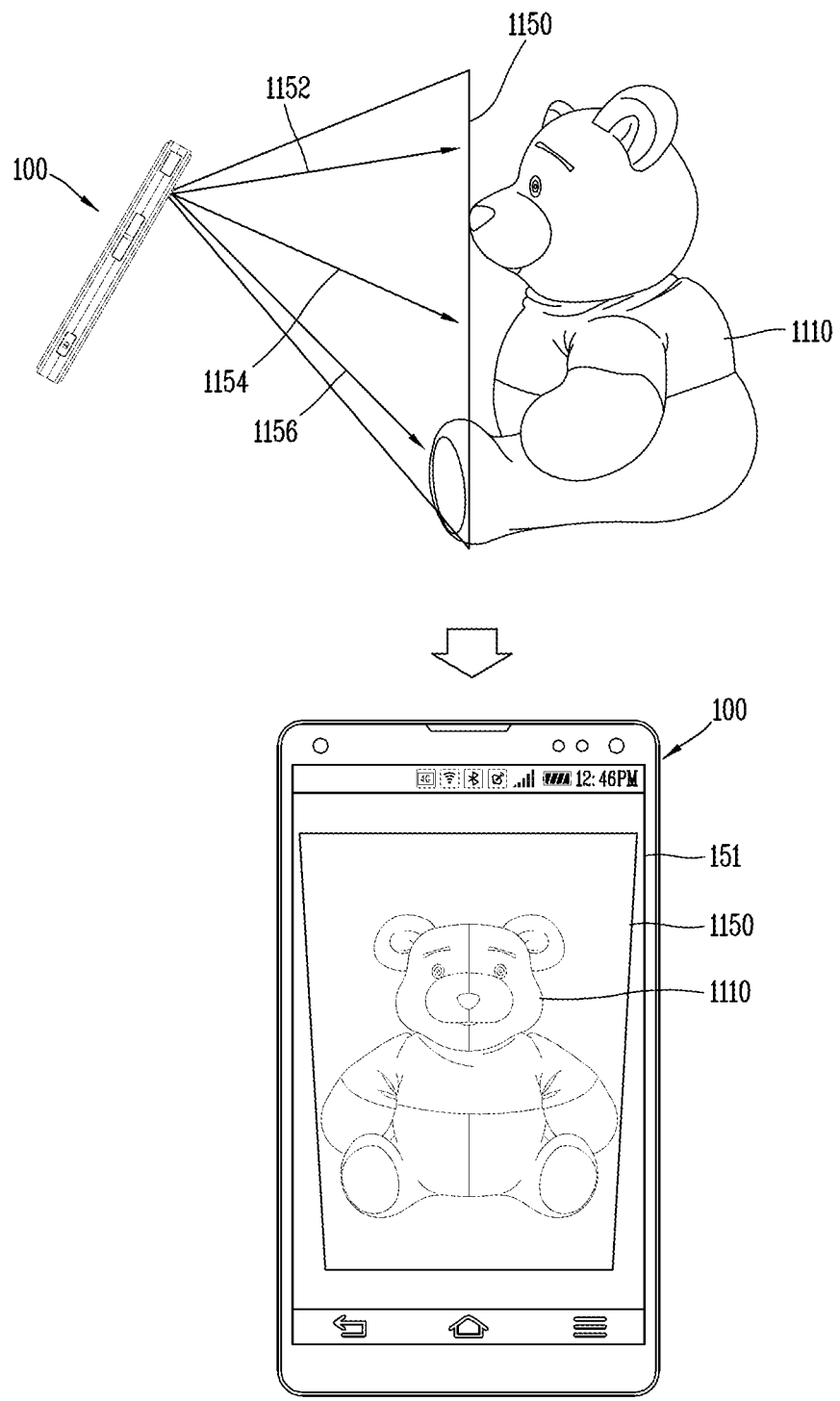
Figure 11C:
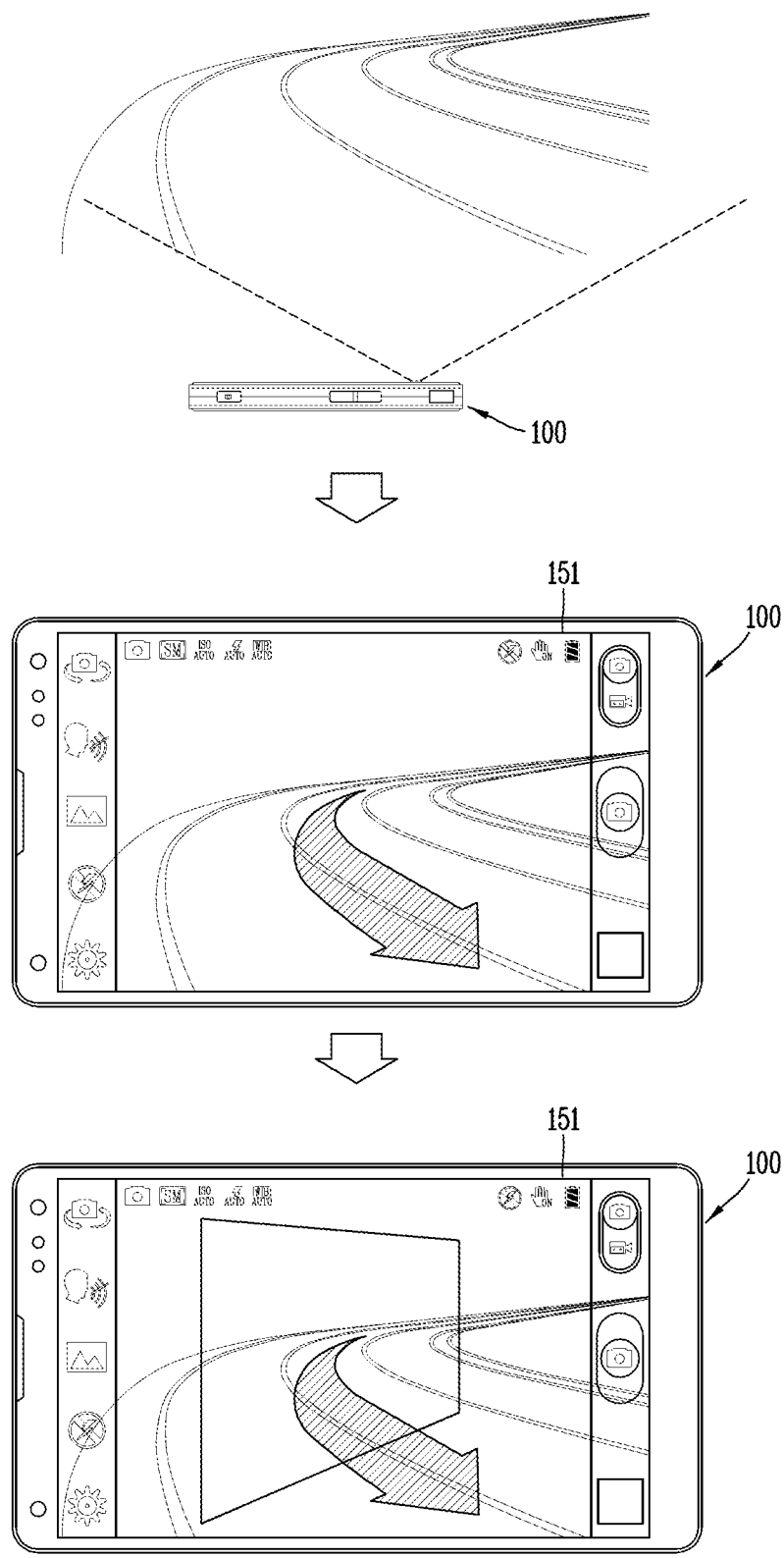

FIGS. 11A to 11C are exemplary views illustrating an example of automatically generating a focal zone according to a composition of an object, in a mobile terminal according to the present disclosure.

For example, when the mobile terminal 100 capturing an object is tilted, a focal plane 1100 of a lens of the camera 121 may be tilted, as illustrated in the first drawing of FIG. 11A. Here, as illustrated in the second drawing of FIG. 11A, due to the tilted state of the focal plane 1100, an object 1110 may have a portion 1110*a* at which a capturing distance is shorter than a focal distance 1102 between the focal plane 1100 and the mobile terminal 100, and a portion 1110*b* at which a capturing distance is longer than the focal distance 1102. Accordingly, an image 1100, which is captured on the focal plane 1100 and output on the display unit 151 of the mobile terminal 100 may be displayed in a state where the portions 1110*a* 1110*b* with the capturing distances unequal to the focal distance are out of focus.

Here, when the object 1110 is sensed in a tilted state due to the object 1110 or the mobile terminal 100 being tilted, the controller 180 of the mobile terminal 100 may automatically generate a more appropriate focal zone according to the tilted state of the object 1110. That is, as illustrated in the first drawing of FIG. 11B, the controller 180 may sense distances, namely, capturing distances from the plurality of lenses of the camera 121 to the object 1110. As illustrated in the first drawing of FIG. 11B, the controller 180 may sense different capturing distances 1152, 1154 and 1156 up to the object 1110. Then, the controller 180 may recognize a composition of the object 1110 based on the sensed capturing distances 1152, 1154 and 1156.

When the composition of the object 1110 is recognized, the controller 180 may generate a focal zone corresponding to the recognized composition. For example, the controller 180 may generate a focal zone based on focal distances corresponding to the capturing distances 1152, 1154 and 1156. Accordingly, the controller 180 of the mobile terminal 100 according to the embodiment disclosed herein may generate a focal zone 1150 in a shape of a tilted plane according to a focal distance corresponding to the shortest capturing distance 1152 and a focal distance corresponding to the longest capturing distance 1156.

Consequently, as illustrated in the second drawing of FIG. 11B, the focal zone 1150 may be generated in a manner that a short focal distance corresponds to the portion 1110*a* of the object 1110 with the short capturing distance and a long focal distance corresponds to the portion 1110*b* of the object 1110 with the long capturing distance. Here, the controller 180, as illustrated in the second drawing of FIG. 11B, may display the currently-generated focal zone 1150 on the display unit 151. And, as illustrated in the second drawing of FIG. 11B, the controller 1820 may display an image, which is focused on both of the portion 1110*a* of the object 1110 with the short capturing distance and the portion 1110*b* of the object 1110 with the long capturing distance, on the display unit 151.

In such a manner, a focal zone can be automatically generated using an analysis result of an image output on the display unit 151, as well as a recognition result of distances up to an object. For example, when a preview image is output on the display unit 151, the controller 180 may analyze a color pattern of the output image, and recognize a composition of the object accordingly.

That is, as illustrated in the first drawing of FIG. 11C, when the mobile terminal 100 captures a running track in a curved shape, the controller 180 may recognize the curved shape of the running track by analyzing an image received from the camera 121. For example, the controller 180 may analyze the image and recognize a pattern that colors belonging to the same or similar range are represented. Accordingly, the controller 180, as illustrated in the second drawing of FIG. 11C, may recognize a shape of the current object according to the color pattern.

Here, the controller 180 may recognize a plurality of capturing distances up to the object using the object-sensing result through the camera 121. The controller 180 may thus recognize the composition of the object, which is currently sensed by the camera 121, based on the shape of the objected recognized based on the recognized capturing distances and the color pattern of the image.

That is, as illustrated in the second drawing of FIG. 11C, when the shape of the object is recognized based on the color pattern, the controller 180 may recognize a portion of the object close to the camera 121 and a portion thereof far away from the camera 121 on the image of the object, based on the capturing distances recognized from the object. Accordingly, when the object is captured at the composition as illustrated in the first drawing of FIG. 11C, the controller 180 may recognize a shape of the running track, and a close portion and a far portion of the curved track with respect to the camera 121.

Therefore, the controller 180 may recognize a composition at which the camera 121 is currently capturing the running track. When the composition of the object is recognized, the controller 180 may set an appropriate focal zone according to the recognized composition of the object. For example, when the object is the running track as illustrated in the second drawing of FIG. 11C, the controller 180 may generate a focal zone in a direction of facing an extending direction the running track. Here, as illustrated in the third drawing of FIG. 11C, the controller 180 may generate a focal zone in a shape of a tilted plane which is perpendicular to the extending direction of the running track.

Meanwhile, the first, second and third drawings of FIG. 11C have illustrated that the focal zone is automatically generated by recognizing the composition of the object. However, the controller 180 may also generate a focal zone using a result obtained by sensing a movement of the object. For example, when there is another object which is moving on the running track formed as illustrated in the second drawing of FIG. 11C, the controller 180 may generate the focal zone based on the movement of the object. For example, the controller 180 may sense at least one of a moving direction, a moving path or a moving velocity of the another object, and generate the focal zone based on the sensed result. Therefore, for the running track illustrated in the second drawing of FIG. 11C, when another object (for example, a player or a runner) is moving on the running track, the controller 180 may generate the focal zone according to a moving state of the player.

The foregoing description has been given under assumption that one focal zone is generated. However, the focal zone may also be generated in plurality.

FIG. 12 is an exemplary view illustrating an example of generating a plurality of focal zones, in a mobile terminal according to the present disclosure.

For example, as illustrated in the first drawing of FIG. 12, when objects 1202, 1204, 1206 and 1208 are output on the display unit 151, the controller 180, as illustrated in the second drawing of FIG. 12, may generate a focal zone including at least some of those objects 1202, 1204, 1206 and 1208. As illustrated in the second drawing of FIG. 12, the controller 180 may generate a focal zone 1210. When the focal zone 1210 is generated, the controller 180 may output on the display unit 151 an image which is focused on the objects 1202, 1204 and 1206 included in the currently-generated focal zone 1210.

Here, the controller 180 may further generate another focal zone according to a user selection or the like. For example, the controller 180 may generate a second focal zone 1220 which includes the first object 1204 which is currently out of focus. Here, the second focal zone 1220, as illustrated in the third drawing of FIG. 12, may be generated in the form including the first object 1204 and the second object 1202, and accordingly, an image which is focused on the first object 1204 and the second object 1202 may be output on the display unit 151.

When the plurality of focal zones are generated, the controller 180 of the mobile terminal 100 may output on the display unit 151 an image which is focused on all of the objects included in the plurality of focal zones, respectively. Accordingly, as illustrated in the third drawing of FIG. 12, the image in which all of the objects included in the first focal zone 1210 and the second focal zone 1220 are in focus may be output on the display unit 151. And, in this case, the controller 180, as illustrated in the fourth drawing of FIG. 12, may store the image focused on each of the plurality of objects having different capturing distances.

Meanwhile, once an object is included in a focal zone, the mobile terminal 100 according to the embodiment may allow the object to be continuously in focus according to a user selection, irrespective of whether or not the object is included in the focal zone.

FIG. 13 is an exemplary view illustrating an example of continuously focusing on an object in a tracking manner once the object is included in a focal zone, in a mobile terminal according to the present disclosure.

For example, as illustrated in the first drawing of FIG. 13, when a focal zone 1300 is generated, the controller 180 may output on the display unit an image in which objects 1302 and 1304 included in the generated focal zone 1300 are all in focus. Here, the controller 180 may execute a recognition (for example, a face recognition) with respect to the objects 1302 and 1304 included in the focal zone 1300. As illustrated in the second drawing of FIG. 13, the controller 180 may detect portions recognizable as faces of persons in images of the objects 1302 and 1304 included in the focal zone 1300, and output the recognized faces on the display unit 151 in a distinctive manner.

For example, the controller 180 may display the portions recognized as the faces using separate graphic objects 1312 and 1314. When the face recognition is completed, the controller 180 may output an image in which the completely-recognized objects are in focus on the display unit 151. For example, even when at least one of the objects 1302 and 1304 included in the focal zone 1300 is moved out of the focal zone 1300, the controller 180 may output on the display unit 151 an image in which the moved object 1304 is continuously in focus. To this end, the controller 180 may adjust a focus on each of the objects which have initially been included in the focal zone 1300 by use of a technology, such as face tracking.

In such a manner, as illustrated in the third drawing of FIG. 13, even when the second object 1304 moves out of the focal zone 1300, the controller 180 may output on the display unit 151 an image in which both of the second object 1304 and the first object 1302 are in focus. Accordingly, the controller 180 may store an image in which only the first and second objects 1302 and 1304 are in focus.

The focal zone may be locked at a specific region of the display unit 151 according to a user selection. Here, when an object is included in the locked focal zone, the controller 180 may output on the display unit 151 an image focused on the object. Also, even when only one object is present, the controller 180 may output an image focused only on a partial region included in the focal zone.

FIG. 14A illustrates an example of displaying an image when a user-set focal zone is locked, in the mobile terminal according to the present disclosure.

For example, the controller 180 may lock a currently-generated focal zone 1400 on the display unit 151 according to a user selection. Here, the controller 180, as illustrated in the first drawing of FIG. 14A, may display on the display unit 151 a graphic object 1402, which indicates that the currently-generated focal zone 1400 is in a locked state.

Here, when the mobile terminal 100 is moved by the user, the controller 180 may display an image received from the camera 121 on the display unit 151 according to the moved state. In this case, the controller 180 may display an image, in which an object 1410 included in the locked focal zone 1400 is in focus, on the display unit 151. For example, when a part 1410a of the object 1410 is included in the locked focal zone 1400, the controller 180 may control the display unit 151 to output an image in which only the part 1410a of the object 1410 included in the focal zone 1400 is in focus. An example under this condition is illustrated in the second drawing of FIG. 14A.

When the object 1410 is entirely included in the focal zone 1400 in response to the user's movement, the controller 180 may control the display unit 151 to output an image focused on a region in which the object 1400 is displayed. Under this state, when the mobile terminal 100 is moved in response to the user's movement, only a part 1410b of the object 1410 may be included in the focal zone 1400. Accordingly, as illustrated in the second drawing of FIG. 14A, the controller 180 may control the display unit 151 to output an image, in which only the part 1410b of the object 1410 included in the focal zone 1400 is in focus.

Meanwhile, FIG. 14A illustrates the example that the region where the currently-generated focal zone 1400 is output on the display unit 151 is fixed. However, unlike this, the focal zone 1400 may also be locked at a region where an object is currently output if a user selection is applied.

In this case, as illustrated in the first and second drawing of FIG. 14B, when locking of the focal zone 1400 is selected by a user, the focal zone 1400 may be locked at the object 1410. Accordingly, the controller 180 may control the display unit 151 to output an image focused on the object 1410, irrespective of the movement of the mobile terminal 100, as illustrated in the third drawing of FIG. 14B.

Meanwhile, the controller 180 of the mobile terminal 100 according to the embodiment disclosed herein may also preset a focal zone and store an image when there is an object sensed within the preset focal zone.

FIG. 15 illustrates an example of storing an image when an object is sensed in a user-set focal zone, in the mobile terminal disclosed herein.

When a generation of a focal zone is selected by the user, as illustrated in the first drawing of FIG. 15, the controller 180 may generate an initial focal zone 1500 having a preset region on the display unit 151 or a preset size, and output the generated initial focal zone 1500 on the display unit 151. In this state, the controller 180 may change the initial focal zone 1500 into a focal zone in a shape of a stereoscopic space or a shape of a tilted plane in a vertical or horizontal direction, on the basis of a depth of field set by the user. The first drawing of FIG. 15 illustrates an example that the focal zone 1500 is changed into the planar shape tilted in the horizontal or vertical direction.

Under this state, the controller 180 may determine whether or not there is an object sensed in the currently-generated focal zone 1500. For example, when there are objects 1502 and 1504 which are moving as illustrated in the second drawing of FIG. 15, the controller 180 may determine whether or not at least one of the objects 1502 and 1504 is included in the focal zone 1500, based on respective capturing distances of the objects 1502 and 1504 which have been obtained from sensing results of the objects 1502 and 1504.

Here, as illustrated in the third drawing of FIG. 15, when the capturing distance of the first object 1502 is included in the focal zone 1500, the controller 180 may store an image currently displayed on the display unit 151. Here, the controller 180 may display a graphic object 1520, which indicates the storage of the image output on the display unit 151, on the display unit 151. Accordingly, the user can recognize through the graphic object 1520 that the image currently output on the display unit 151 can be stored or has been stored. Here, as illustrated in the fourth drawing of FIG. 15, an image in which the first object 1502 is in focus may be stored.

The foregoing description has been given of those detailed embodiments, but various modifications or changes can be embodied without departing from the scope of the present disclosure. Specifically, the embodiments disclosed herein have illustrated that only a still image is stored, but the present disclosure may not be limited to this. That is, the mobile terminal 100 according to embodiments of the present disclosure may also store videos as well as the still images, through similar processes to the aforementioned processes. In this case, the controller 180 may store a video in which a plurality of objects located at different capturing distances are in focus, by use of a focal zone generated according to the embodiments disclosed herein.

Hereinafter, description will be given of effects which can be provided by the mobile terminal and the control method thereof disclosed herein.

In accordance with at least one of those embodiments disclosed herein, one region of an image output on a display unit can be set to a focal zone according to a user-selected depth of field. This may enable capturing of an image in which an object located within the set region is in focus.

Also, in accordance with at least one of those embodiments disclosed herein, the set focal zone may be generated based on a plurality of capturing distances. This may enable capturing of an image having a composition, which is appropriate for a position of the object, even without a change in a capturing composition, a capturing posture or a depth of field.

The aforementioned present disclosure can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera that is configured to sense objects using a plurality of lenses;
a display that is configured to output an image received through the camera; and
a controller that is configured to control a focus of the objects in the image,
wherein capturing distances between the plurality of lenses and the objects are recognized using sensed information for the objects, a focal zone defined by different focal distances corresponding to some of the recognized capturing distances is generated, and two or more of the sensed objects corresponding to the different focal distances included in the focal zone are in focus in the image outputted on the display,
wherein the focal zone defined by the different focal distances includes a plurality focal planes formed along the different focal distances, and
wherein the controller is further configured to:
generate an initial focal zone that corresponds to a specific focal distance for one of the objects represented in a selected region of first image,
change the initial focal zone to the focal zone that includes the plurality focal planes corresponding to the different focal distances, based on a depth of field set for all or part of the initial focal zone, and
control the display to output the image in which the two or more objects included in the different focal planes are in focus.

2. The mobile terminal of claim 1, wherein the focal zone is formed in a shape of a stereoscopic space or a plane based on whether a portion in which the depth of field is set is all or part of the selected region.

3. The mobile terminal of claim 2, wherein the controller determines whether a touch input is applied to all or part of the selected region, based on at least one of a position, strength or a duration of the touch input applied to the selected region.

4. The mobile terminal of claim 1, wherein the depth of field is set through a user touch input applied to the selected region or through a graphical object for setting the depth of field.

5. The mobile terminal of claim 1, wherein the depth of field is decided according to a length of a drag input applied, consecutive to a user touch input with respect to one point of the selected region.

6. The mobile terminal of claim 1, wherein the controller displays a guide line in the vicinity of the focal zone, the guide line provided for distinguishing the generated focal zone.

7. The mobile terminal of claim 6, wherein the guide line is displayed with different colors or in different shapes to correspond to each of the plurality of focal distances that define the focal zone.

8. The mobile terminal of claim 1, wherein the controller further generates the focal zone corresponding to a shape of the object based on the recognized capturing distances.

9. The mobile terminal of claim 8, wherein the controller analyzes a color pattern of the image received through the camera, recognizes a composition of the object based on the analyzed color pattern and the recognized capturing distances, and further generates the focal zone according to the recognized composition.

10. The mobile terminal of claim 8, wherein the controller further generates the focal zone using at least one of a movement direction, a movement tacking or a movement velocity of a moving object when the moving object in the image received through the camera is sensed.

11. The mobile terminal of claim 8, wherein the controller changes a viewing angle of the camera based on the recognized shape of the object, and further generates the focal zone using sensed information for the object according to the changed viewing angle of the camera.

12. The mobile terminal of claim 1, wherein the controller changes a viewing angle of the camera on the basis of the generated focal zone when the focal zone is generated.

13. The mobile terminal of claim 1, wherein the controller generates a plurality of focal zones according to a user selection, and wherein the image includes a plurality of objects which have different capturing distances and are in focus in the image, and are included in respective ones of the plurality of focal zones.

14. The mobile terminal of claim 1, wherein the controller performs face recognition for the object included in the focal zone, wherein the controller displays an image on the display in which the face-recognized object is continuously in focus, even when the face-recognized object moves outside the focal zone.

15. The mobile terminal of claim 1, wherein the controller locks the focal zone according to a user selection, and outputs an image on the display in which objects included in the locked focal zone are maintained in focus in the image.

16. The mobile terminal of claim 15, wherein the controller outputs a graphical object that indicates the locked state of the focal zone, the graphical object being displayed in a vicinity of the focal zone on the display.

17. The mobile terminal of claim 1, wherein the controller senses whether there is an object included in the focal zone when the focal zone is generated, and when the object is sensed to be in the focal zone, stores an image or video in which the object is in focus.

18. A mobile terminal comprising
a camera having a plurality of lenses;
a display that is configured to output an image received through the plurality of lenses; and
a controller that is configured to generate the image for display on the display,
wherein the image includes a first object positioned at a first distance from the camera and having a first focal distance, a second object positioned at a second distance from the camera and having a second focal distance, the first and second focal distances being different distances,
wherein the first object is captured at the first focal distance by a first lens among the plurality of lenses and the second object is captured at the second focal distance by a second lens among the plurality of lenses,
wherein a focal zone is generated to include both the first object and the second object and the image is generated based on the focal zone to include the first object captured through the first lens and the second object captured through the second lens such that both the first and second objects in the image are in focus, and
wherein the focal zone includes a plurality focal planes formed along a plurality of different focal distances that includes the first focal distance and the second focal distance.

19. The mobile terminal of claim 18, wherein the controller is further configured to:
generate an initial focal zone corresponding to a specific focal distance,
change the initial focal zone to the focal zone that includes the plurality focal planes based on a depth of field set for all or part of the initial focal zone,
control the display to output the image in which a plurality of objects, including the first object and the second object, in the plurality of focal planes are in focus.

20. A control method for a mobile terminal having a camera, the method comprising:
sensing a plurality of objects using a plurality of lenses provided in the camera, and outputting an image of the plurality of objects;
recognizing a plurality of capturing distances between the camera and the plurality of objects, the capturing distances corresponding to focal distances which are different from one another using sensed information for the plurality of objects;
generating a focal zone defined by a plurality of the focal distances corresponding to some of the plurality of capturing distances; and
outputting an image in which two or more of the objects in the focal zone are in focus,
wherein the focal zone includes a plurality focal planes formed along the plurality of different focal distances,
wherein the generating the focal zone includes generating an initial focal zone corresponding to a specific focal distance, and changing the initial focal zone to the focal zone including the plurality focal planes based on a depth of field set for all or part of the initial focal zone, and,
wherein the outputting the image includes displaying the image in which the two or more objects included in the plurality of focal planes are in focus.

* * * * *